United States Patent
Kadota

(10) Patent No.: US 6,953,415 B2
(45) Date of Patent: Oct. 11, 2005

(54) VEHICLE CONTROL APPARATUS

(75) Inventor: Keiji Kadota, Zama (JP)

(73) Assignee: Nissan Motor Co., Ltd., Yokohama (JP)

(*) Notice: Subject to any disclaimer, the term of this patent is extended or adjusted under 35 U.S.C. 154(b) by 42 days.

(21) Appl. No.: 10/641,146

(22) Filed: Aug. 15, 2003

(65) Prior Publication Data

US 2004/0040760 A1 Mar. 4, 2004

(30) Foreign Application Priority Data

Sep. 3, 2002 (JP) .................................. 2002-257639

(51) Int. Cl.⁷ .............................................. B60K 41/02
(52) U.S. Cl. ............................. 477/5; 477/12; 180/65.2
(58) Field of Search .................. 477/12, 8, 5; 180/65.2, 180/65.8

(56) References Cited

U.S. PATENT DOCUMENTS

| | | | |
|---|---|---|---|
| 6,434,469 B1 | 8/2002 | Shimizu et al. | |
| 6,442,454 B1 | 8/2002 | Akiba et al. | |
| 6,691,809 B2 * | 2/2004 | Hata et al. ................ | 180/65.3 |
| 6,757,599 B2 * | 6/2004 | Nada ......................... | 701/29 |
| 2003/0010559 A1 | 1/2003 | Suzuki | |
| 2003/0064858 A1 | 4/2003 | Saeki et al. | |
| 2003/0089539 A1 | 5/2003 | Kadota | |
| 2003/0151381 A1 | 8/2003 | Kadota et al. | |
| 2004/0040759 A1 * | 3/2004 | Shimizu et al. ........... | 180/65.2 |
| 2004/0044458 A1 * | 3/2004 | Kadota ....................... | 701/55 |
| 2004/0055304 A1 * | 3/2004 | Shimizu et al. ........... | 60/698 |

FOREIGN PATENT DOCUMENTS

| JP | 7-222477 A | 8/1995 |
|---|---|---|
| JP | 10-80174 A | 3/1998 |
| JP | 2000-125588 A | 4/2000 |
| JP | 2001-106108 A | 4/2000 |
| JP | 2001-138764 A | 5/2001 |
| JP | 2002-64904 A | 2/2002 |
| JP | 2002-200932 A | 7/2002 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |

* cited by examiner

Primary Examiner—Dirk Wright
(74) Attorney, Agent, or Firm—Shinjyu Global IP Counselors, LLP.

(57) ABSTRACT

A vehicle apparatus is provided to enable a clutch to be re-engaged without creating a shock when there is rollback of the wheels, which are driven by an electric motor via the clutch. The vehicle apparatus comprises a travel direction command determining section, an electric motor counter-electromotive force detecting section and a wheel rotational direction determining section. The travel direction command determining section is configured to determine whether a forward travel command or a reverse travel command has been issued. The electric motor counterelectromotive force detecting section is configured to detect a counterelectromotive force of an electric motor that drives a wheel of a vehicle. The wheel rotational direction determining section is configured to determine whether the wheel is rotating in an opposite direction to a vehicle travel direction command determined by the travel direction command determining section, based on a determination that a polarity of the counterelectromotive force detected by the electric motor counterelectromotive force detecting section does not match the vehicle travel direction command determined by the travel direction command determining section.

26 Claims, 14 Drawing Sheets

| Field of Motor 4 / Rotational Direction of Motor 4 | Normal Direction Field (Forward Drive Range) | Reverse Direction Field (Reverse Drive Range) |
|---|---|---|
| Normal | E > 0 (Rollback Absent) | E > 0 (Rollback Present) |
| Reverse | E < 0 (Rollback Present) | E < 0 (Rollback Absent) |

Fig. 10

VEHICLE CONTROL APPARATUS

BACKGROUND OF THE INVENTION

1. Field of the Invention

The present invention relates to a vehicle control apparatus for use with electric motor driven wheels, such as in an electric motor four-wheel drive vehicle, wherein an internal combustion engine drives one pair of wheels among the front and rear wheels, and the motive power from an electric motor appropriately drives the other pair of wheels via a clutch. More particularly, the present invention relates to an apparatus that discriminates the rotational direction and controls the drive of the electric motor-driven wheels.

2. Background Information

A hybrid four-wheel drive vehicle is disclosed in Japanese Laid Open Patent Application No. 2002-218605, is in which a pair of electric motor driven wheels are appropriately driven by the motive power from an electric motor via a clutch. This vehicle drives the front or rear wheels by an internal combustion engine, and the rear or front wheels are capable of being driven by an electric motor via a clutch, wherein the electric motor is directly driven by the electrical power from a four-wheel drive specialized generator that is coupled to and driven by the internal combustion engine.

In summary, the hybrid four-wheel drive is enabled by generating electrical power by applying a load to the generator of a magnitude up to the point where the wheels driven by the engine are about to undergo acceleration slippage, or applying a load to the generator corresponding to just the surplus torque portion of the engine when acceleration slippage has occurred; driving the electric motor by the electric power generated thereby, and at that time transmitting to the electric motor driven wheels the motive power from the electric motor via the clutch, which has been engaged.

Basically, leaving the clutch in a released state when not in four-wheel drive avoids a decline in fuel economy by ensuring that the electric motor driven wheels do not excessively pull on the electric motor. However, the clutch is left in an engaged state because it is preferable to shift to a four-wheel drive state due to the significant risk that the engine driven wheels will experience acceleration slippage when starting from a stop.

When starting from a stop, a load is applied to the generator corresponding to the amount that the accelerator pedal is depressed, thereby generating electric power. That generated electric power drives the electric motor, and the vehicle is thereby started from a stop in a four-wheel drive state.

In view of the above, it will be apparent to those skilled in the art from this disclosure that there exists a need for an improved vehicle control apparatus. This invention addresses this need in the art as well as other needs, which will become apparent to those skilled in the art from this disclosure.

SUMMARY OF THE INVENTION

It has been discovered that in shifting to four-wheel travel from a clutch-released state by engaging the clutch and driving the electric motor driven wheels, the electric motor is first idled before engaging the clutch, the motor-side rotational speed of the clutch is increased until it nearly matches the wheel-side rotational speed, and the clutch is engaged at the point when those two speeds match. This is a common-sense anti-shock measure.

However, a rotational speed sensor, which is essential to determine whether the abovementioned rotational speeds match, cannot detect extremely low speeds (vehicle speed equivalent of, for example, less than 1.5 km/h). When detection malfunctions, the speed must be estimated in a time series sequence based on the acceleration and deceleration up to that point. Further, attempts to also detect rotational direction when it is once again possible to detect the rotational speed have been impractical because of increased costs. In this current state of affairs, the rotational direction of the detected rotational speed remains unknown, and therefore the only recourse has been to estimate the rotational direction of the electric motor driven wheels based on the driver's travel direction command (in the case of an automatic transmission, the drive range D is forward travel direction, and the drive range R is reverse travel direction), creating the problems explained below.

For example, consider the case in which the vehicle is stopped on an ascending road with the transmission in the drive range D. When starting from that stop, the driver lifts their foot from the brake pedal. When the driver is about to depress the accelerator pedal, the vehicle is unable to hold the stop by the grip torque of the automatic transmission, and rolls back a bit (this is generally referred to as rollback).

In this case, the electric motor driven wheels rotate in reverse (hereinafter, referred to as reverse rotation) due to the rollback of the vehicle. This reverse rotation continues until the vehicle begins to move forward by the depression of the accelerator pedal.

However, if the clutch is released because the engine driven wheels are not experiencing acceleration slippage, and the engine driven wheels subsequently experience acceleration slippage by the depression of the accelerator pedal, then this is detected and the controller idles the electric motor so that the rotational speeds of the input and output of the clutch are matched, whereupon the controller engages the clutch.

Incidentally, if the electric motor driven wheels rotate in reverse due to the rollback of the vehicle, as described above, and this rotational direction cannot be detected, then the controller therefore mistakenly determines that the electric motor driven wheels are rotating forward (hereinafter, referred to as normal rotation) based on the fact that the present selection is in the drive range. Thus, the electric motor is idled in the normal rotational direction in order to coincide with that determination.

Consequently, although the absolute values of the input/output rotational speeds of the clutch are identical, the rotational direction on the wheel side of the clutch is the reverse rotational direction, and the rotational direction on the electric motor side is the normal rotational direction. If the rotational directions do not match, the input/output speed differential of the clutch doubles, resulting in a large shock when the clutch is engaged.

To solve the abovementioned problems, one object of the present invention is to enable the discrimination of the rotational direction of the electric motor driven wheels. At the beginning of rollback when the clutch is engaged at a time when the vehicle is stopped, the electric motor is dragged by the electric motor driven wheels. It is another object of the present invention to provide an apparatus capable of discriminating the rotational direction using the polarity of the counterelectromotive force based on the actual recognition of a counterelectromotive force that is generated with a polarity corresponding to the drag direction.

It is yet another object of the present invention to propose a drive control apparatus for electric motor driven wheels, wherein the abovementioned discrimination results are used to solve the problems of the present invention.

In view of the above, the present invention provides a vehicle apparatus comprises a travel direction command determining section, an electric motor counterelectromotive force detecting section and a wheel rotational direction determining section. The travel direction command determining section is configured to determine whether a forward travel command or a reverse travel command has been issued. The electric motor counterelectromotive force detecting section is configured to detect a counterelectromotive force of an electric motor that drives a wheel of a vehicle. The wheel rotational direction determining section is configured to determine whether the wheel is rotating in an opposite direction to a vehicle travel direction command determined by the travel direction command determining section, based on a determination that a polarity of the counterelectromotive force detected by the electric motor counterelectromotive force detecting section does not match the vehicle travel direction command determined by the travel direction command determining section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 10 is an explanatory diagram that illustrates the relationship between the rear-wheel drive motor rotational direction, the counterelectromotive force, and the motor field direction (travel direction command), according to the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
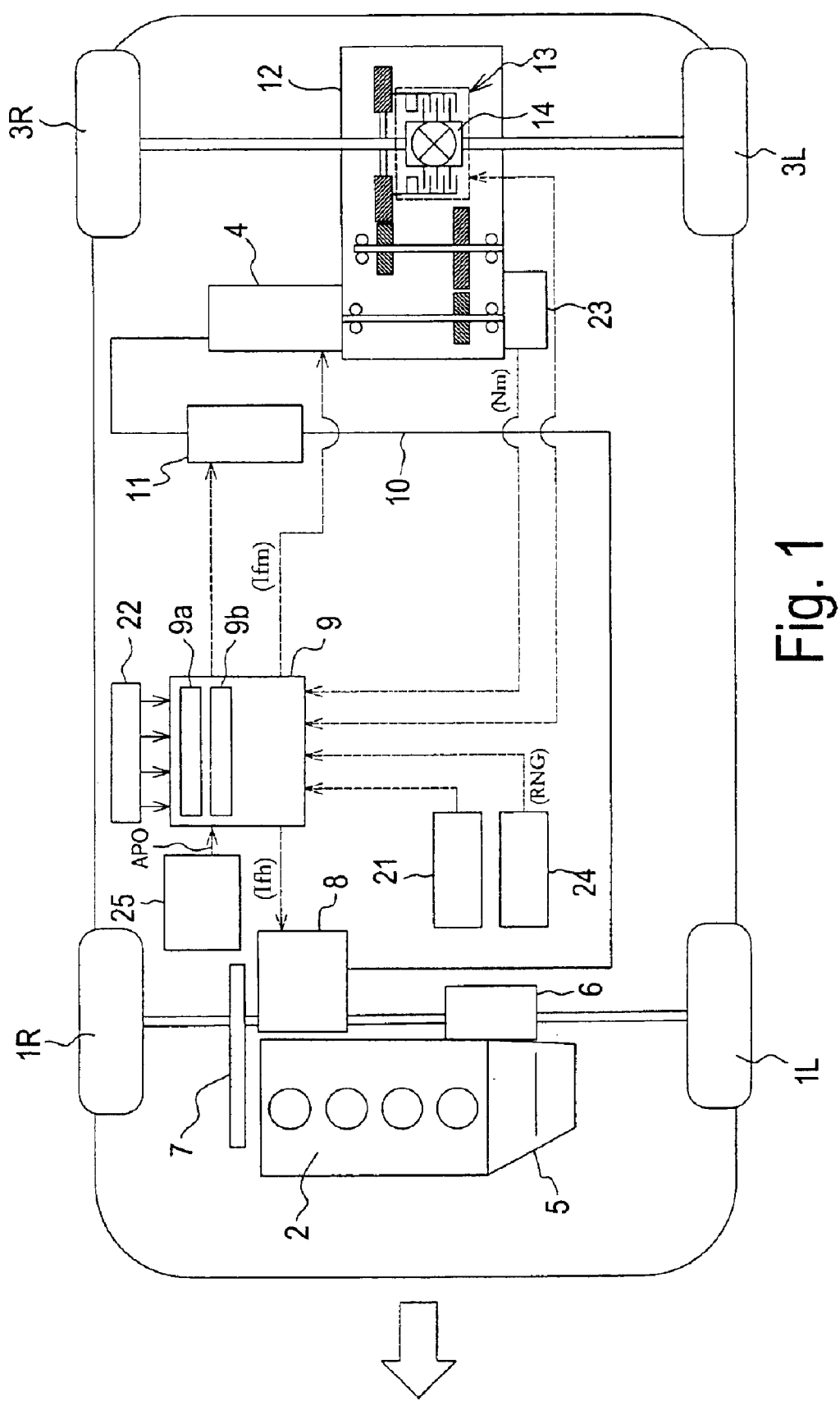
FIG. 1 is a schematic block diagram of a hybrid four-wheel drive vehicle equipped with a vehicle control apparatus having a rotational direction determining apparatus for electric motor driven wheels and a drive control apparatus for electric motor driven wheels in accordance with a first embodiment of the present invention.

Referring initially to FIG. 1, a hybrid four-wheel drive vehicle is diagrammatically illustrated that is equipped with the vehicle control apparatus in accordance with the present invention. FIG. 1 is a schematic block diagram of a hybrid four-wheel drive vehicle equipped with a vehicle control apparatus having a rotational direction determining apparatus for electric motor driven wheels and a drive control apparatus for electric motor driven wheels in accordance with a first embodiment of the present invention. In the this embodiment, shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. In other words, the vehicle is based on a front-engine, front-wheel drive vehicle (F/F vehicle) with the internal combustion engine 2 driving the left and right front wheels 1L and 1R, and the electric motor 4 driving the left and right rear wheels 3L and 3R when a four-wheel drive mode is needed.

A portion of the engine output torque of the internal combustion engine 2 is transmitted to the left and right front wheels 1L and 1R through an automatic transmission 5, equipped with a torque converter, and a differential gear 6 in a conventional manner. An endless drive belt 7 transfers power from the internal combustion engine 2 to a specialized generator 8, which supplies electrical energy to the electric motor 4. Thus, a portion of the engine output torque of the internal combustion engine 2 is transmitted to the generator 8 through the endless belt drive 7 to supply electrical energy to the electric motor 4. The generator 8 rotates at a rotational speed that is equal to the product of the rotational speed of the internal combustion engine 2 and the pulley ratio of the endless drive belt 7. A generation torque is applied to the internal combustion engine 2 corresponding to the field current Ifh, which is adjusted by the four-wheel drive controller 9, and the generator 8 generates electric power corresponding to the load torque.

The following explains the system for driving the rear wheels by the electric motor 4. Basically, the system is similar to the electric motor four-wheel drive vehicle disclosed in Japanese Laid Open Patent Application No. 2002-218605.

The electric power generated by the generator 8 is supplied to the rear-wheel drive electric motor 4 by an electrical line 10 via a relay 11.

The voltage generated by the generator 8 can be supplied to the electric motor 4 through the electrical line 10. A relay 11 is provided at an intermediate point in the electrical line 10 between the electric motor 4 and the generator 8. The relay 11 cuts off the electrical line 10 by a command from the four-wheel drive controller 9 when there is a control failure of the generator 8, and cuts off the electrical line 10 so that, even if some electric power is generated by the permanent magnets when the four-wheel drive controller 9 has not applied a generation load to the generator 8 because rear-wheel drive is not needed, that generated electric power is not supplied to the electric motor 4.

The drive shaft of the electric motor 4 is connected to the rear wheels 3L and 3R via a reduction gear 12, a built in clutch 13 and a differential gear 14 in a conventional manner. The output torque of the electric motor 4 increases by the gear ratio of the reduction gear 12. If the clutch 13 is engaged, that increased torque is distributed and output to the left and right rear wheels 3L and 3R by the differential gear 14.

The engagement and release of the clutch 13, and the rotational direction and drive torque of the electric motor 4 are controlled by the four-wheel drive controller 9. The clutch 13 is preferably an electromagnetic clutch that connects and disconnects in response to a clutch control command issued from the four-wheel drive controller 9. Of course, a hydraulic clutch that is electrically controlled can be used for clutch 13 is certain situations to carry out the present invention. Thus, the clutch 13 transmits torque from the electric motor 4 to the rear wheels 3L and 3R at a torque transfer rate corresponding to the clutch control command from the four-wheel drive controller 9. When the clutch 13 is engaged, the vehicle is in a four-wheel (multi-wheel) drive state in which all of the wheels 1L, 1R, 3L and 3R can be driven. When the clutch 13 is released, the vehicle is in a two-wheel (non-all wheel) drive state in which only the front wheels 1L and 1R are driven by the internal combustion engine 2.

In the control of the electric motor 4, the four-wheel drive controller 9 controls the motor drive torque by adjusting the field current Ifm supplied to the electric motor 4, and controls the motor rotational direction by the direction of the field current Ifm.

The four-wheel drive controller 9 performs the above-mentioned control of the electric motor 4, the generator 8, the relay 11, and the clutch 13 by receiving various input signals that are indicative of the current driving conditions. In particular, the four-wheel drive controller 9 receives input signals from a four-wheel drive switch 21, a wheel speed sensor group 22, an electric motor rotational speed sensor 23, an inhibitor switch 24 and an accelerator position opening degree sensor 25. The input signal from the four-wheel drive switch 21 is indicative of whether the vehicle is in a four-wheel drive enabled mode or a two-wheel drive fixed mode. The input signals from the wheel speed sensor group 22 detects each of the front wheel speeds $V_{WFL}$ and $V_{WFR}$ of the left and right front wheels 1L and 1R and the rear wheel speeds $V_{WRL}$ and $V_{WRR}$ of the left and right rear wheels 3L and 3R, respectively. The input signal from the electric motor rotation sensor 23 detects the rotational speed Nm of the rear-wheel drive electric motor 4 and thus functions as an electric motor rotational speed detecting section of the present invention. The input signal from the inhibitor switch 24 detects whether a selected drive range signal RNG (driver's travel direction command) of the automatic transmission 5 is in a forward drive range D or a reverse drive range R. The input signal from the accelerator position opening degree sensor 25 detects the accelerator pedal depression amount APO or the throttle opening degree amount, depending on the type of sensor, e.g., an accelerator pedal sensor or a throttle sensor.

Furthermore, as explained below, while the four-wheel drive switch 21 is turned on by the driver, the four-wheel drive controller 9 determines that four-wheel drive is needed, and automatically performs electric motor four-wheel drive. Further, while the four-wheel drive switch 21 is turned off by the driver, the four-wheel drive controller 9 continuously performs two-wheel drive by driving just the front two wheels 1L and 1R with the engine 2.

Figure 2:
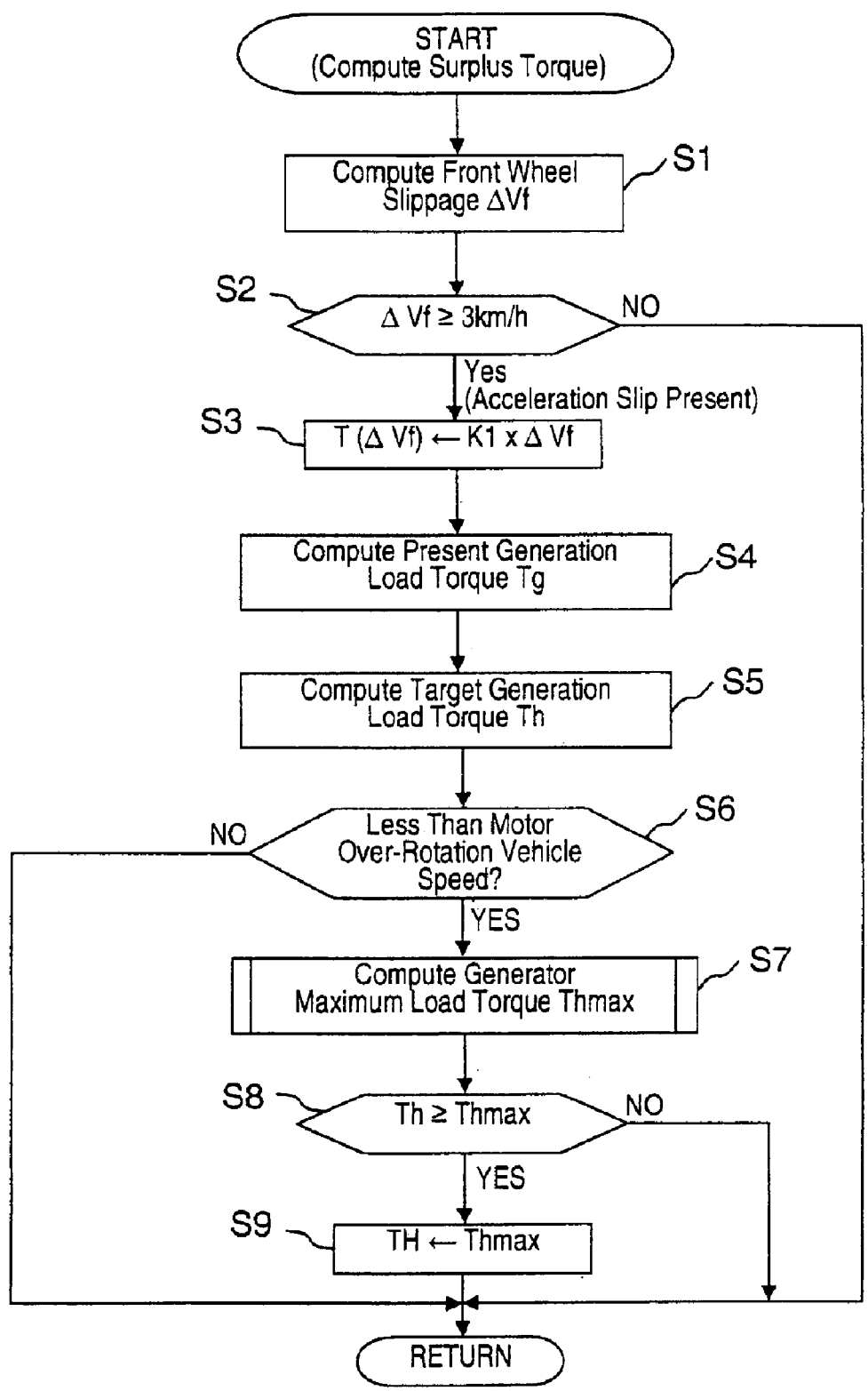
FIG. 2 is a flow chart that illustrates an engine surplus torque computing program executed by a four-wheel drive controller in the drive control system of the hybrid four-wheel drive vehicle in accordance with a first embodiment of the present invention.

As seen in FIG. 2, the four-wheel drive controller 9 is illustrated that preferably includes a microcomputer with a 4WD control program that is operatively configured and arranged relative to the internal combustion engine 2, the electric motor 4 and the generator 8 to control the torque applied to the left and right front wheels 1L and 1R by the internal combustion engine 2 and the torque applied to the left and right rear wheels 3L and 3R by an electric motor 4 as discussed below. The four-wheel drive controller 9 can also include other conventional components such as an input interface circuit, an output interface circuit, and storage devices such as a ROM (Read Only Memory) device and a RAM (Random Access Memory) device. The memory circuit stores processing results and control programs. The RAM of the four-wheel drive controller 9 stores statuses of operational flags and various control data for the control program. The ROM of the four-wheel drive controller 9 stores various operations for the control program. The four-wheel drive controller 9 is capable of selectively controlling any of the components of the driving force control apparatus in accordance with the control program. It will be apparent to those skilled in the art from this disclosure that the precise structure and algorithms for the four-wheel drive controller 9 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

The four-wheel drive controller 9 serving as the drive control section adjusts the field current of the generator 8 and thereby adjusts the load that the generator 8 imposes on the engine 2. The generated voltage of the generator 8 is in accordance with the imposed load torque. Thus, the load placed on the internal combustion engine 2 by the generator 8 due to the field current of the generator 8 is adjusted by the four-wheel drive controller 9 to generate a voltage corresponding to the load torque. The generator 8 then generates an electromotive force in proportion to this load torque.

The following explains the basic four-wheel drive control performed by the four-wheel drive controller 9. As shown by the surplus torque computing processing in FIG. 2, the four-wheel drive controller 9 first computes the surplus torque of the internal combustion engine 2, which is the torque that corresponds to the acceleration slippage occurring in the front wheels 1L and 1R (engine driven wheels). The flow chart of FIG. 2 forms the surplus torque computing section 9a of the four-wheel drive controller 9.

First, in step S1, the average front wheel speed $V_{WF}$ is computed from the front wheel speeds $V_{WFL}$ and $V_{WFR}$ detected by the wheel speed sensor group 22, and the average rear wheel speed $V_{WR}$ is computed from the rear wheel speeds $V_{WRL}$ and $V_{WRR}$ that are likewise detected by the wheel speed sensor group 22.

The slippage speed $\Delta Vf$ can be calculated as follows. The average front wheel speed $V_{WF}$ (which is the average of the left and right wheel speeds for the front wheels 1L and 1R) and the average rear wheel speed $V_{WR}$ (which is the average of the left and right wheel speeds for the rear wheels 3L and 3R) are calculated using the following two Equations (1) and (2):

$$V_{WF}=(V_{WFL}+V_{WFR})/2 \quad (1)$$

$$V_{WR}=(V_{WRL}+V_{WRR})/2 \quad (2)$$

The slippage speed $\Delta Vf$ of the left and right front wheels 1L and 1R (engine driven wheels) is then computed.

Now, the slippage speed (acceleration slippage magnitude) $\Delta Vf$ of the front wheels 1L and 1R is calculated by the differential between the average front wheel speed $V_{WF}$ and the average rear wheel speed $V_{WR}$, as set forth in the following Equation (3):

$$\Delta Vf=V_{WF}-V_{WR} \quad (3)$$

Next, in step S2, the four-wheel drive controller 9 determines whether the left and right front wheels 1L and 1R are experiencing acceleration slip by determining whether the slippage speed $\Delta Vf$ of the left and right front wheels 1L and 1R is greater than or equal to a predetermined value, for example, 3 km/h. Thus, steps S1 and S2 constitute an acceleration slippage detection section that estimates if acceleration slippage is occurring in the front wheels 1L and 1R that is driven by the internal combustion engine 2.

If the four-wheel drive controller 9 determines that the slippage speed $\Delta Vf$ is less than 3 km/h, then it is assumed that no acceleration slip is occurring and that there is no surplus of engine output, and control therefore terminates without further processing.

In step S3, when there is acceleration slip as determined in step S2 by the slippage speed $\Delta Vf$ being greater than or equal to 3 km/h, the surplus torque of the engine that corresponds to the acceleration slip of the front wheels 1L and 1R, i.e., the absorbed torque $T(\Delta Vf)$ needed to control or suppress the acceleration slip, is computed by the following Equation (4). The absorption torque $T\Delta V_F$ is an amount that is proportional to the acceleration slippage magnitude.

$$T(\Delta Vf)=K1\times\Delta Vf. \quad (4)$$

where: K1 is a gain that is found through experimentation or the like.

Next, in step S4, the current load torque Tg of the generator 8 is derived. Furthermore, in step S5, the target generation load torque Th of the generator 8 is derived by calculating the sum of the current load torque Tg and the absorbed torque $T(\Delta Vf)$.

In step S6, the four-wheel drive controller 9 determines whether the vehicle speed, which can be derived from the wheel speeds $V_{WFL}$, $V_{WFR}$, $V_{WRL}$ and $V_{WRR}$, is less than a predetermined electric motor over-rotation vehicle speed (e.g., 30 km/h), which is the lower limit of the vehicle speed range at which the electric motor 4 is over-rotated when the clutch 13 is engaged.

If the wheel speed is greater than or equal to the motor over-rotation vehicle speed, the electric motor 4 is over-rotating, causing durability of the electric motor 4 to degrade. Therefore, four-wheel drive is not performed when the vehicle is traveling over predetermined motor over-rotation vehicle speed. In other words, four-wheel drive control is terminated without further processing when the vehicle is traveling over predetermined electric motor over-rotation vehicle speed. However, if the vehicle speed is traveling at a speed less than the predetermined motor over-rotation vehicle speed, then control proceeds to step S7, where the maximum load torque Thmax of the generator 8 is derived.

Next, in step S8, the four-wheel drive controller 9 determines whether the target generation load torque Th of the generator 8 is greater than or equal to the maximum load torque Thmax. If the target generation load torque Th is greater than or equal to the maximum load torque Thmax, i.e., Th≧Thmax is true, then the target generation load torque Th is limited to the maximum load torque Thmax, i.e., Th=Thmax, which is the feasible limit. If the target generation load torque Th is less than the maximum load torque Thmax, i.e., Th≦Thmax is true, then processing terminates, and the target generation load torque Th takes on the value derived in step S5 without further processing.

Furthermore, FIG. 2 explained a method of deriving the target generation load torque Th of generator 8 only for the case in which acceleration slip arises in the engine driven wheels 1L and 1R. However, if there is a risk that the engine driven wheels 1L and 1R will experience acceleration slip, or if the engine driven wheels 1L and 1R are in a low-speed state that is less than or equal to a predetermined speed, then the target generation load torque Th of the generator 8 needed to realize electric motor four-wheel drive is computed in accordance with the vehicle operating conditions.

Figure 3:
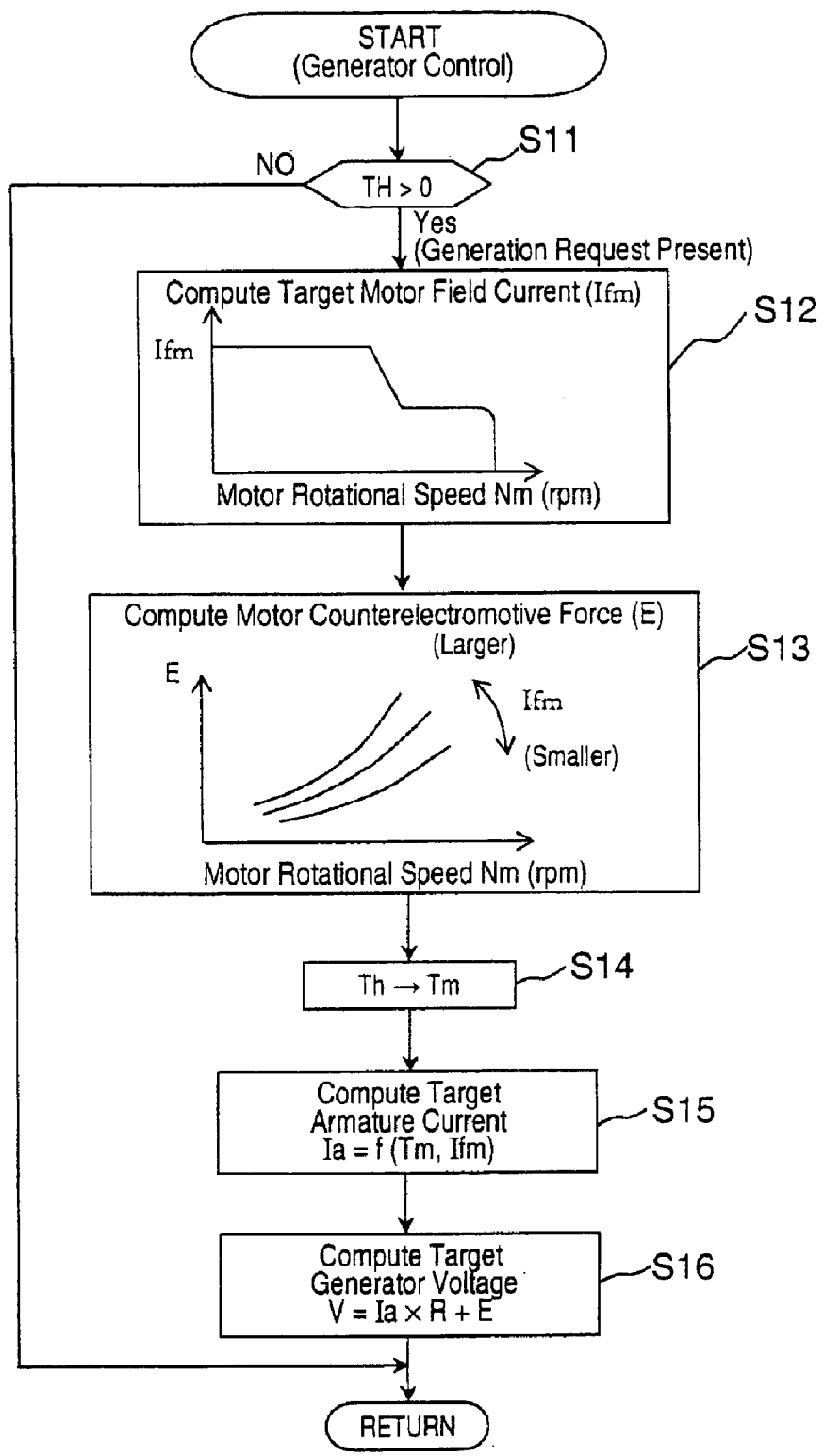
FIG. 3 is a flow chart showing a generator control program executed by the four-wheel drive controller of the hybrid four-wheel drive vehicle in accordance with a first embodiment of the present invention.

In accordance with the generator control program shown in FIG. 3, the four-wheel drive controller 9 controls the generator 8 and the electric motor 4 based on the target generation load torque Th of the generator 8, which is derived as described above. The flow chart of FIG. 3 forms a generator control section 9b of the four-wheel drive controller 9.

In step S11, the four-wheel drive controller 9 determines whether there is a demand for electric power generation by determining whether the target generation load torque Th of the generator 8 is positive. If there is no demand for electric power generation, then control terminates. Thus, a generation load of the generator 8 is not applied to the internal combustion engine 2, and the clutch 13 is left in a released state.

If there is a demand for electric power generation, then control proceeds to step S12, where the target electric motor field current Ifm is computed from the rotational speed Nm based on a predetermined map. Then, the computed Ifm is sent to the electric motor 4 as a control command.

Simultaneously, although not shown, when the input/output rotational speeds of the clutch 13 are determined to coincide, the clutch 13 is engaged, enabling the rotation of the electric motor 4 to be transmitted by the rear wheels 3L and 3R.

In step S12, as shown in FIG. 3, the target electric motor field current Ifm with respect to the rotational speed Nm of the electric motor 4 is taken as the fixed predetermined current value if the electric motor rotational speed Nm is less than or equal to a predetermined rotational speed. If the electric motor rotational speed Nm rises greater than the predetermined rotational speed, then the field current Ifm of the electric motor 4 is reduced by the well-known weak field control method.

The reason for the above is as follows. If the electric motor 4 reaches a high rotational speed, then the motor torque declines due to an increase in the induced voltage of the counterelectromotive force E of the motor 4. If the electric motor rotational speed Nm becomes greater than or equal to a predetermined value, then the current flowing to the electric motor 4 is increased so as to obtain the required electric motor torque Tm by reducing the electric motor field current Ifm of the electric motor 4, and thereby lowering the counterelectromotive force E of the electric motor 4.

Next, in step S13, the counterelectromotive force E of the electric motor 4 is computed, based on a predetermined map, from the target electric motor field current Ifm, which was derived as described above, and from the rotational speed Nm of the electric motor 4.

Furthermore, in step S14, the target motor torque Tm corresponding to the generation load torque Th is computed. Next, in step S15, the target armature current Ia, which is a function of the target motor torque Tm and the target electric motor field current Ifm, is computed. Subsequently, in step S16, the target voltage V of the generator 8 is computed from the target armature current Ia, the total resistance R, and the motor counterelectromotive force E, using the following Equation (5).

$$V = Ia \times R + E \tag{5}$$

The four-wheel drive controller 9 uses feedback control to control the field current Ifh of the generator 8 so that the actual voltage of the generator 8 becomes the target voltage V derived above.

The control executed by the four-wheel drive controller 9 as discussed above corresponds to a regular electric motor four-wheel drive control. The following discusses in detail the rotational direction discriminating process and the drive control process for the electric motor driven wheels 3L and 3R according to the present invention.

Figure 4:
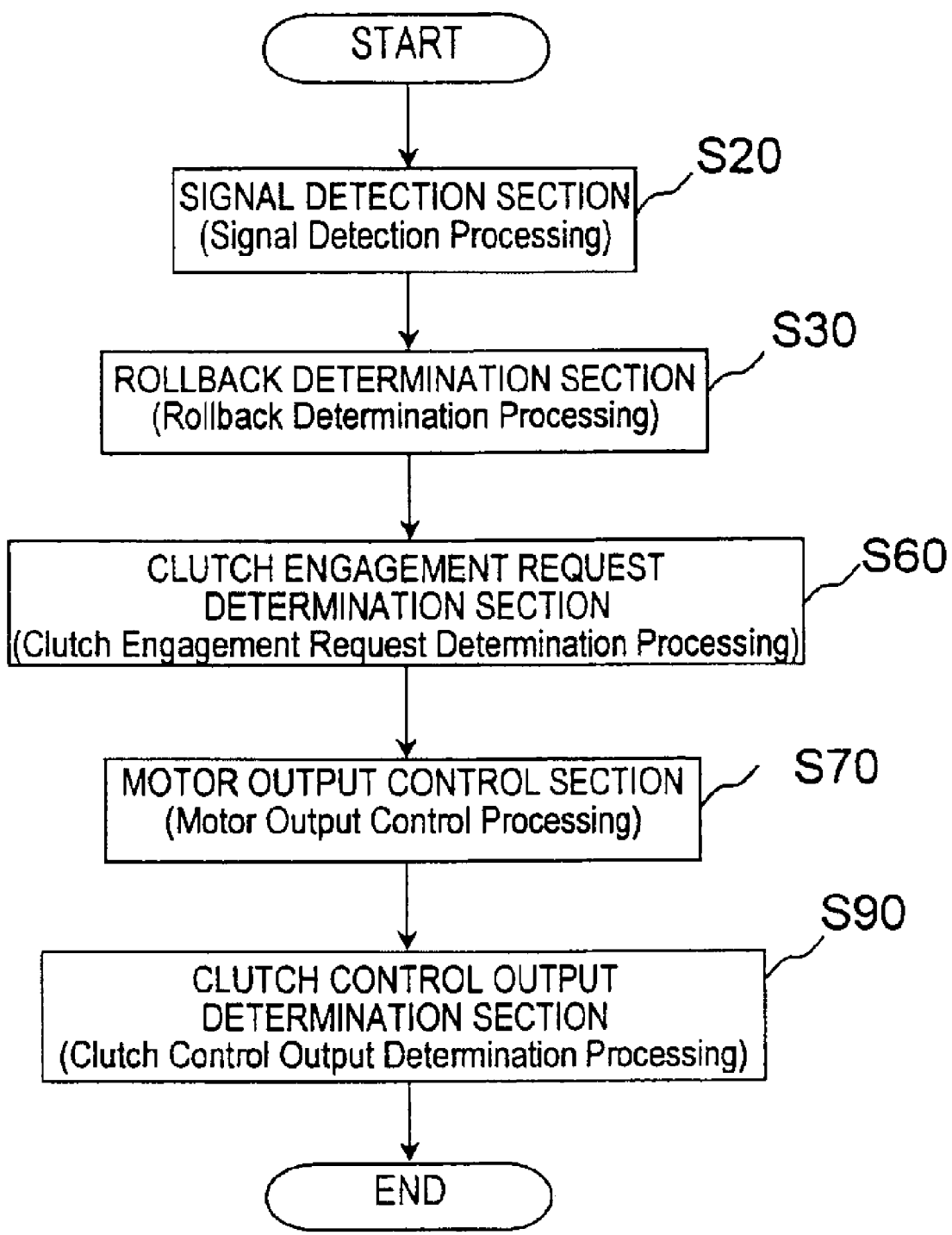
FIG. 4 is a flow chart of the main routine that is executed by the four-wheel drive controller of the hybrid four-wheel drive vehicle in accordance with a first embodiment of the present invention, that illustrates the rotational direction determination processing and drive control processing of the hybrid vehicle.

FIGS. 4 through 9 illustrate one embodiment of the present invention. FIG. 4 is the main routine that shows the rotational direction discriminating process and the drive control process for the electric motor driven wheels.

Figure 5:
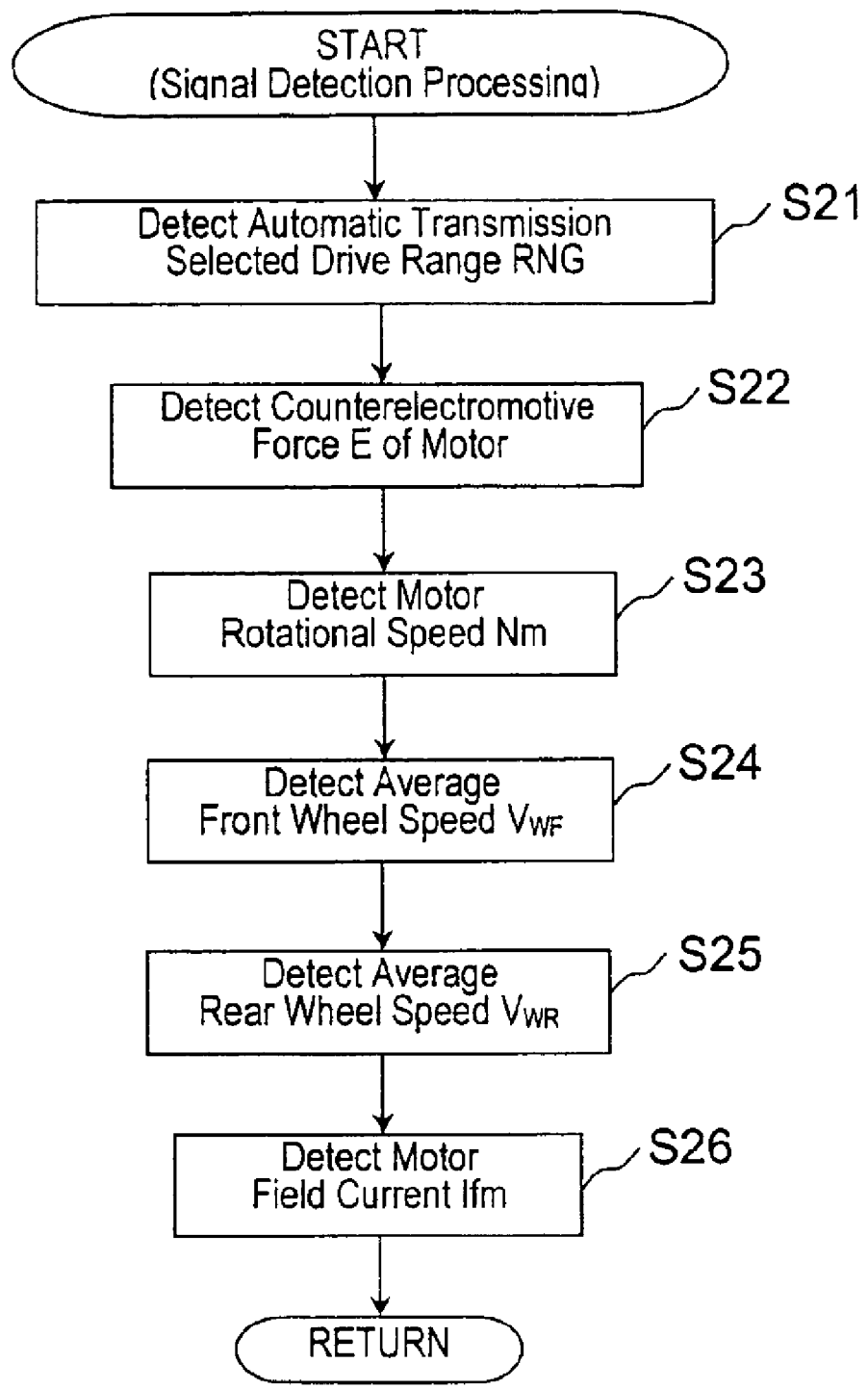
FIG. 5 is a flow chart of a subroutine related to the signal detection processing of the main routine of the hybrid four-wheel drive vehicle in accordance with a first embodiment of the present invention.

Referring to FIG. 4, in step S20, the four-wheel drive controller 9 executes the signal detection processing illustrated in FIG. 5. In step S30, the four-wheel drive controller 9 executes the rollback determination processing illustrated in FIG. 6. In step S60, the four-wheel drive controller 9 executes the clutch engagement request determination processing illustrated in FIG. 7. In step S70, the four-wheel drive controller 9 executes the motor output control processing illustrated in FIG. 8. In step S90, the four-wheel drive controller 9 executes the clutch control output decision processing illustrated in FIG. 9.

When performing the signal detection processing illustrated in FIG. 5, in step S21, the four-wheel drive controller 9 first detects, based on a selected drive range signal RNG, whether the driver is commanding the automatic transmission 5 to travel in a forward direction, such as in the forward drive range D, or commanding the automatic transmission 5 to travel in reverse direction, such as in the reverse drive range R.

In step S22 of FIG. 5, which corresponds to the counterelectromotive force detecting section of the present invention, the motor counterelectromotive force E of the electric motor 4, which was derived in step S13 of FIG. 3, is detected. In step S23, which corresponds to the motor rotational speed detecting section of the present invention, the rotational speed Nm of the electric motor 4, which was measured by the sensor 23, is detected.

Next, in step S24 and step S25, the same as in step S1 of FIG. 2, the average front wheel speed $V_{WF}$, which can be derived from the front wheel speeds $V_{WFL}$ and $V_{WFR}$ detected by the wheel speed sensor group 22; and the average rear wheel speed $V_{WR}$, which can be derived from the rear wheel speeds $V_{WRL}$ and $V_{WRR}$ detected likewise by the wheel speed sensor group 22, are detected.

Lastly, in step S26, the target electric motor field current Ifm derived in step S12 of FIG. 3, is detected as the field current of the electric motor 4.

Figure 6:
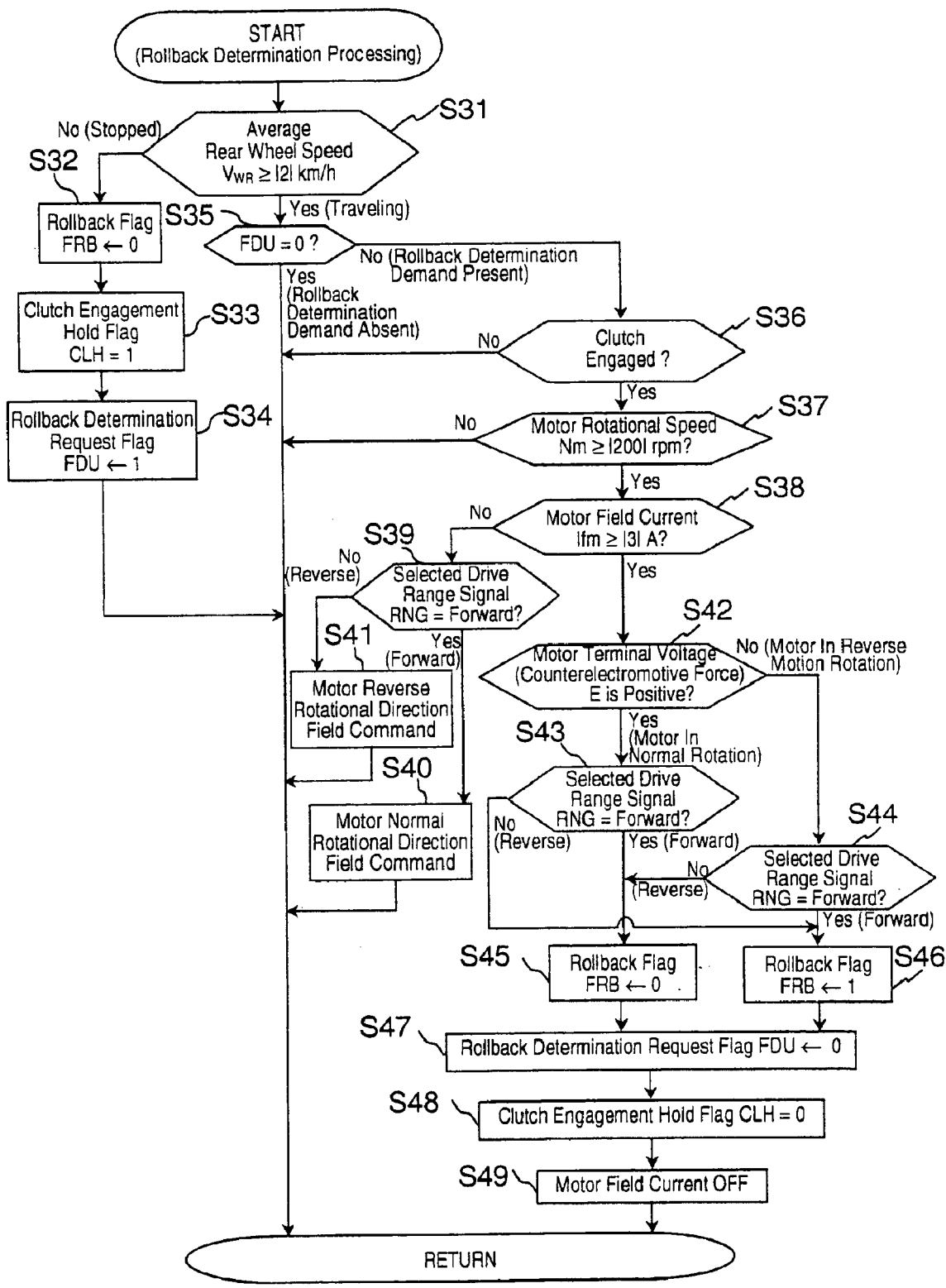
FIG. 6 is a flow chart of a subroutine related to the rollback determination processing of the main routine of the hybrid four-wheel drive vehicle in accordance with a first embodiment of the present invention.

The rollback determination processing performed in step S30 of FIG. 4 is discussed in detail in FIG. 6. First, in step S31, the average rear wheel speed $V_{WR}$ of the rear wheels 3L and 3R, which is not experiencing acceleration slip because the engine is not being driven, is compared with the vehicle stopped determination speed (e.g., |2| km/h). If the average rear wheel speed $V_{WR}$ is greater than or equal to the vehicle stopped determination speed, then the vehicle is determined to be traveling. If the average rear wheel speed $V_{WR}$ is less than the vehicle stopped determination speed, then the vehicle is determined to be stopped.

The reason for prescribing, for example, |2| km/h as the stopped vehicle determination speed is to assign a vehicle speed somewhat higher than the wheel speed detection limit, which is approximately 1.5 km/h.

In step S31, while the vehicle is determined to be stopped, control proceeds to step S32 through step S34. In step S32, the rollback flag FRB is reset to 0. In step S33, an engagement hold flag CLH for the clutch 13, used for making a rollback determination, is set to 1. In step S34, the rollback determination request flag FDU, which is also used for making a rollback determination, is set to 1.

While the vehicle is determined to be traveling in step S31, the four-wheel drive controller 9 determines in step S35 whether there is a rollback determination request based on the rollback determination request flag FDU.

Herein, the rollback determination request flag FDU is a flag for storing the determination result, wherein the flag is set to 1 in step S34 every time the vehicle stops, whereupon a request for a rollback determination is made; and the flag is set to 0 after rollback presence is determined, as discussed later, at the start of travel, and a rollback determination request is not made until the next time the vehicle stops.

In step S35, when the four-wheel drive controller 9 determines that the rollback determination request flag FDU is 0 (rollback determination request absent), control naturally terminates without any further processing.

When the four-wheel drive controller 9 determines in step S35 that the rollback determination request flag FDU is 1 (rollback determination request present), the four-wheel drive controller 9 determines whether three conditions are met in step S36 through S38 in order to make a rollback determination.

In step S36, the four-wheel drive controller 9 determines whether the electric motor 4 and the electric motor driven wheels 3L and 3R are coupled in a state wherein the clutch 13 is engaged. In addition, the four-wheel drive controller 9 determines in step S37 whether the rotational speed (greater than or equal to |200| rpm) of the electric motor 4 is at a speed that generates a counterelectromotive force. Furthermore, in step S38, the four-wheel drive controller 9 determines whether the field current value (greater than or equal to |3| A) is a value at which the field current ifm of electric motor 4 can generate a counterelectromotive force.

If it was determined in step S36 that the clutch 13 was not in an engaged state, or if the electric motor rotational speed was determined in step S37 to be less than |200| rpm, then the rollback determination conditions are not met, and control terminates without further processing. Thus, a relevant determination (i.e., a rollback determination) is not made.

In step S38, if the four-wheel drive controller 9 determines that the field current Ifm of the electric motor 4 is less than |3| A, then control proceeds to step S39.

In step S39, if the travel direction command is in the forward command state as determined by the selected drive range signal RNG of the automatic transmission, then control proceeds to step S40.

In step S40, a field command in the normal rotational direction is given to the electric motor 4.

If the reverse command state is determined in step S39, control proceeds to step S41, where a field command in the reverse rotational direction is given to the electric motor 4.

If the conditions of step S38 are satisfied, and step S38 can then turn over control to the rollback determination processing starting with step S42. In performing the rollback determination processing, step S42 first determines whether the terminal voltage E (counterelectromotive force) of the electric motor 4 is positive or negative. The polarity of the motor counterelectromotive force E is decided, as shown in FIG. 10, by the direction in which the electric motor 4 is dragged by the electric motor driven wheels 3L and 3R. If the wheels are rotating forward (the electric motor 4 is dragged in the normal rotational direction), then the polarity of the motor counterelectromotive force E is positive. If the wheels are rotating in reverse (the electric motor 4 is dragged in the reverse rotational direction), then the polarity of the motor counterelectromotive force E is negative.

After the polarity of the motor counterelectromotive force E has been determined as described above, control proceeds to step S43 or step S44 where the four-wheel drive controller 9 determines, based on the selected drive range signal RNG of the automatic transmission, whether the driver has given a forward travel command or a reverse travel command.

Accordingly, step S43 and step S44 correspond to a travel direction command determining section of the present invention.

If the polarity of the motor counterelectromotive force E was determined to be positive in step S42 (the electric motor 4 is being dragged in the normal rotational direction by the rear wheels 3L and 3R), and the selected drive range of the automatic transmission was determined to be in the forward travel drive range in step S43, then, as can be seen in FIG. 10, both determinations are in accord with one another. Thus, a determination result is made that the electric motor driven wheels 3L and 3R are rotating in a direction corresponding to the selected drive range. Therefore, in step S45, the rollback flag FRB is reset to 0 to indicate that rollback is absent.

If the four-wheel drive controller 9 determines in step S42 that the polarity of the motor counterelectromotive force E is positive (the electric motor 4 is being dragged in the forward direction by the rear wheels 3L and 3R), and the four-wheel drive controller 9 determines in step S43 that the selected drive range of the automatic transmission is the reverse travel drive range, then, as can be seen in FIG. 10, the two determinations are not in accord with one another. Thus, a determination result is made that the electric motor driven wheels 3L and 3R are rotating in a direction the reverse of the direction corresponding to the selected drive range. Consequently, in step S46, the rollback flag FRB is set to 1 to indicate that rollback is present.

If the four-wheel drive controller 9 determines in step S42 that the polarity of the motor counterelectromotive force E is negative (the electric motor 4 is being dragged in the reverse rotational direction by the rear wheels 3L and 3R), and the four-wheel drive controller 9 determines in step S44 that the selected drive range of the automatic transmission is in the forward travel drive range, then, as shown in FIG. 10, both determinations are not in accord with one another. Thus, a determination result is made that the electric motor driven wheels 3L and 3R are rotating in a direction that is the reverse of the direction corresponding to the selected drive range. Consequently, in step S46, the rollback flag FRB is set to 1 to indicate that rollback is present.

If the four-wheel drive controller 9 determines in step S42 that the polarity of the motor counterelectromotive force E is negative (the electric motor 4 is being dragged in the reverse rotational direction by the rear wheels 3L and 3R), and the four-wheel drive controller 9 determines in step S44 that the selected drive range of the automatic transmission is the reverse travel drive range, then, as can be seen in FIG. 10, both determinations are in accord with one another. Thus, a determination result is made that the electric motor driven wheels 3L and 3R are rotating in the direction corresponding to the selected drive range. Consequently, in step S45, the rollback flag FRB is reset to 0 to indicate that rollback is absent.

Accordingly, step S45 and step S46, along with step S42 constitute an electric motor driven wheel rotational direction determining section according to the present invention.

As described above, if a rollback determination terminates once after travel starts, then control proceeds to step S47, where the rollback determination request flag FDU is set to 0. Consequently, by step S35 subsequently terminating control without further processing, the rollback determination result is stored until the next vehicle stopped determination is made in step S31.

In step S48, the clutch engagement hold flag CLH, which is not needed due to the termination of the rollback determination, is reset to 0. Furthermore, in step S49, the electric motor field current Ifm, which is no longer needed due to the termination of the rollback determination, is set to off, and the rollback determination processing terminates.

Figure 7:
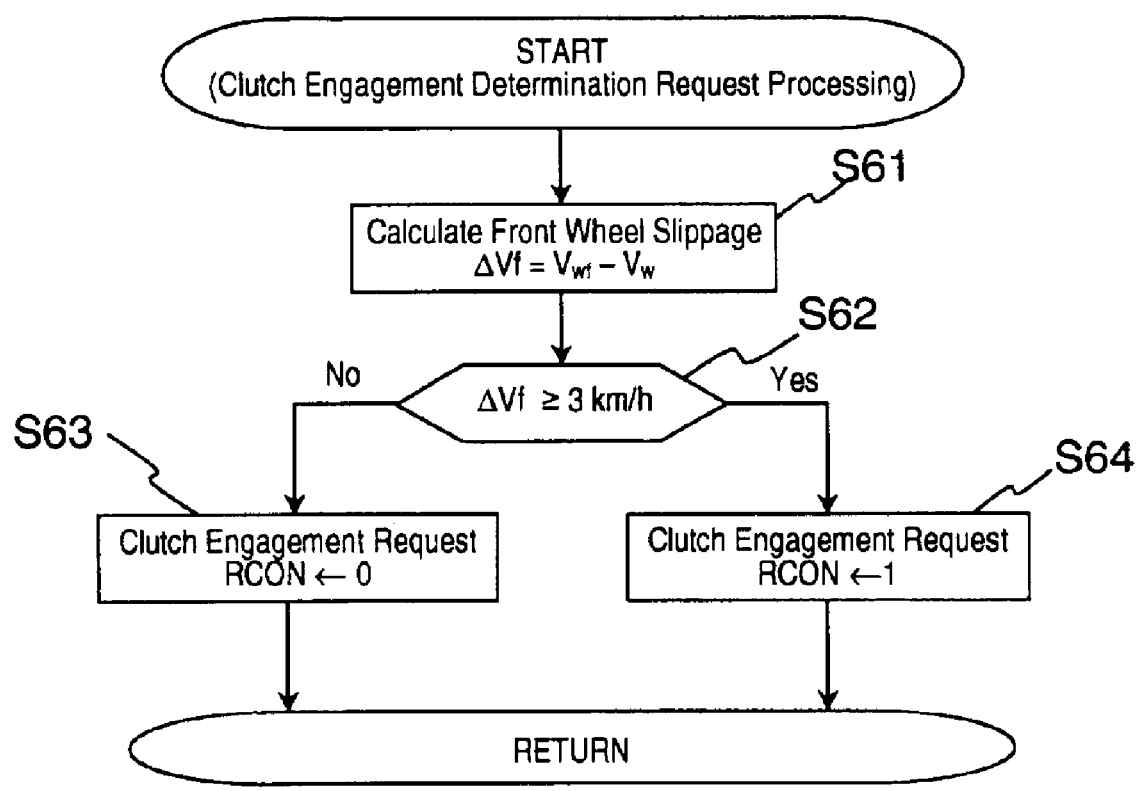
FIG. 7 is a flow chart of a subroutine related to the clutch engagement request determination processing of the main routine of the hybrid four-wheel drive vehicle in accordance with a first embodiment of the present invention.

The clutch engagement request determination processing performed in step S60 of FIG. 4 is described in detail in FIG. 7. First, in step S61, the slippage speed ΔVf of the left and right front wheels 1L and 1R (engine driven wheels) is derived by subtracting the average rear wheel speed $V_{WR}$ of the rear wheel speeds $V_{WRL}$, $V_{WRR}$ from the average front wheel speed $V_{WF}$ of the front wheel speeds $V_{WFL}$, $V_{WFR}$.

Next, in step S62, the four-wheel drive controller 9 determines whether there is acceleration slip by determining whether the slippage speed ΔVf of the left and right front wheels 1L and 1R is greater than or equal to a predetermined value, e.g. 3 km/h.

If the four-wheel drive controller 9 determines that the slippage speed ΔVf is less than 3 km/h, then control proceeds to step S63 because there is no acceleration slip and the rear wheels do not need to be driven by the electric motor 4. In step S63, the engagement request RCON of the clutch 13 is reset to 0.

If it was determined in step S62 that the slippage speed ΔVf was greater than or equal to 3 km/h, and there is acceleration slip, then the rear wheels need to be driven by the electric motor 4, and control therefore proceeds to step S64. In step S64, the engagement request RCON of the clutch 13 is reset to 1. Thus, step S64 forms a clutch engagement control section that is further configured to allow the engagement of the clutch (13), when input and output rotational speeds of the clutch (13) are substantially equal.

Thus, step S64 forms a clutch engagement command section of the present invention that is configured to command an engagement of the clutch 13 disposed between the electric motor 4 and the wheel 3L and 3R when the electric motor 4 is required to drive the wheel 3L and 3R.

Figure 8:
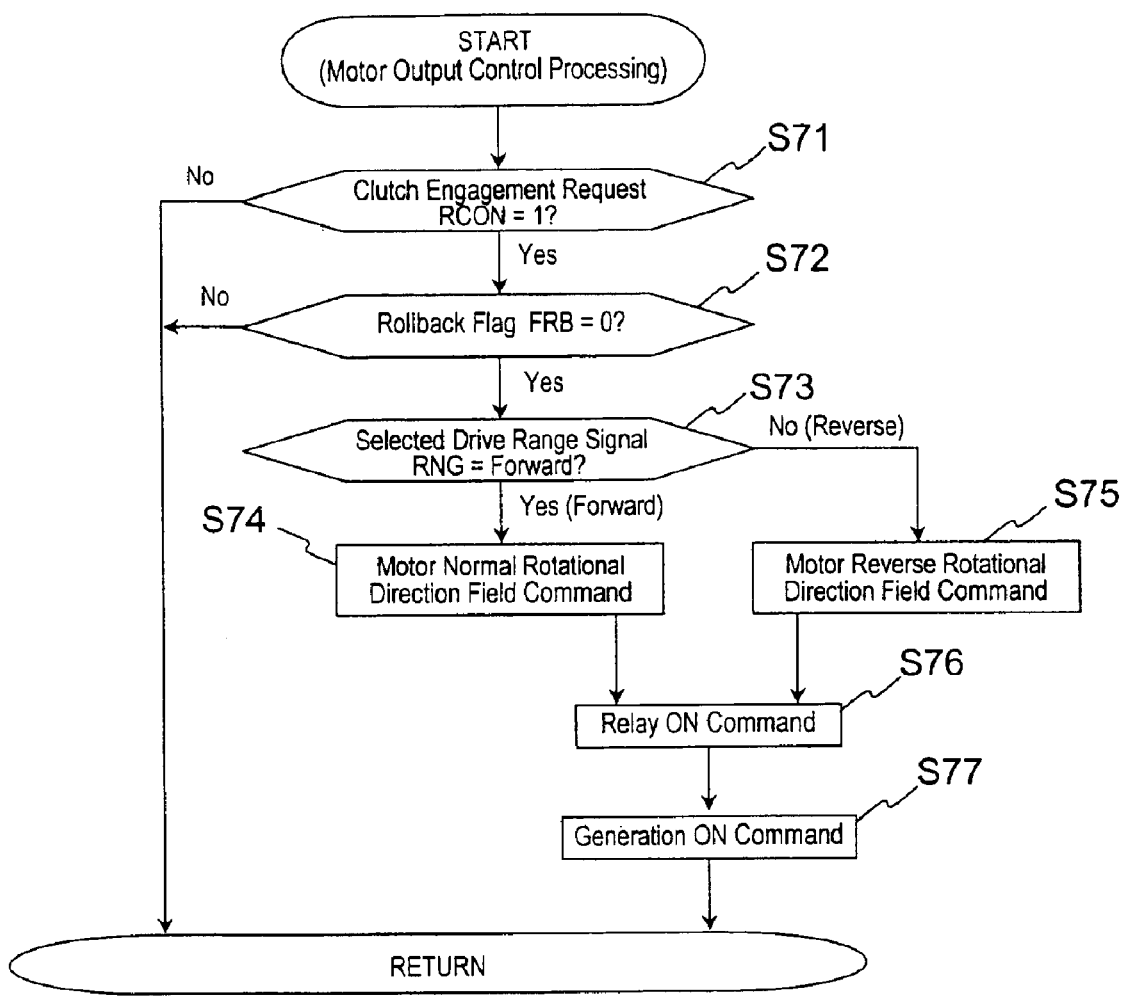
FIG. 8 is a flow chart of a subroutine related to the motor output control processing of the main routine of the hybrid four-wheel drive vehicle in accordance with a first embodiment of the present invention.

The motor output control processing executed in step S70 of FIG. 4 is discussed in greater detail in FIG. 8. First, in step S71, the four-wheel drive controller 9 determines whether the engagement request RCON of the clutch 13 is 1. In step S72, the four-wheel drive controller 9 determines whether the rollback flag FRB is 0. If it was determined in step S71 that the clutch engagement request RCON is 0 (No), or if it was determined in step S72 that the rollback flag FRB is 1 (rollback present), then control terminates without further processing, and the rear wheels are not driven by the electric motor 4.

However, if it was determined in step S71 that the clutch engagement request RCON is 1 (Yes), and it was determined in step S72 that the rollback flag FRB is 0 (rollback absent), then control proceeds to step S73, where the electric motor 4 is driven and thereby the rear wheels are driven, as discussed below.

In other words, depending on the travel direction command that was determined from the selected drive range signal RNG of the automatic transmission in step S73, control proceeds to step S74 if found to be in the forward command state, where a field current in the normal rotational direction is applied to the electric motor 4 and the electric motor 4 is given a normal rotation command. On the other hand, control proceeds to step S75 if found to be in the reverse command state, where a field current in the reverse rotational direction is applied to the electric motor 4, and a reverse rotation command is given to the electric motor 4.

Subsequently, in step S76, the relay 11 is turned on and the electrical line 10 is energized. Furthermore, in step S77, as shown in FIG. 3, the generator 8 is controlled and made to generate electric power, and a torque corresponding to this generated electric power in the direction corresponding to the travel direction command drives the electric motor 4 in a direction corresponding to the selected drive range based on the field direction command and so that the torque is output towards the rear wheels 3L and 3R. Thus, step S77 forms an electric motor output control section configured to control the electric motor 4 to generate an output torque in a direction corresponding to the vehicle travel direction command determined by the travel direction command determining section (steps S43, S44), when the clutch 13 is engaged in accordance with the clutch engagement command section (step S64).

Figure 9:
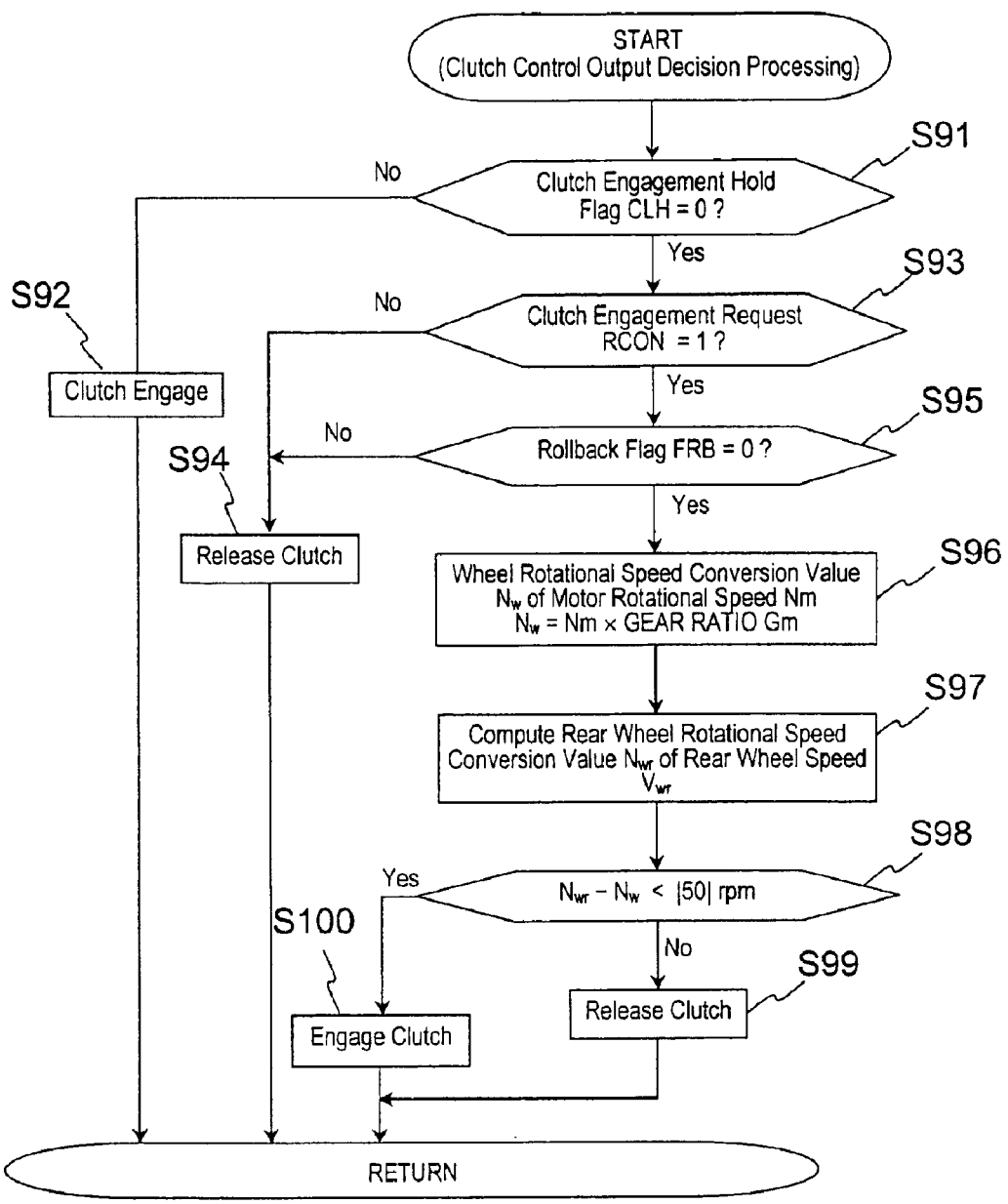
FIG. 9 is a flow chart of a subroutine related to the clutch control output decision processing of the main routine of the hybrid four-wheel drive vehicle in accordance with a first embodiment of the present invention.

The clutch control output decision processing executed in step S90 of FIG. 4 is described in greater detail below, as seen in FIG. 9. First, in step S91, the four-wheel drive controller 9 determines whether the clutch engagement hold flag CLH is 0.

Because the engagement state of the clutch 13 must be restored if the clutch engagement hold flag CLH is not 0, control proceeds to step S92 where the clutch 13 is engaged.

If the four-wheel drive controller 9 determines in step S91 that the clutch engagement hold flag CLH is 0, then control proceeds to step S93, where the four-wheel drive controller 9 determines whether the clutch engagement request RCON is 1 at this time. If the clutch engagement request RCON is 0, then control proceeds to step S94, where the clutch 13 is released.

If it was determined in step S93 that the clutch engagement request RCON was 1, then control proceeds to step S95, where the four-wheel drive controller 9 determines whether rollback is present by determining whether the rollback flag FRB is 0.

If the rollback flag FRB is 1, i.e., it was determined that rollback was present, then control proceeds to step S94, even if, for example, the results of the determination in step S93 was that the clutch engagement request RCON was 1 (i.e., there was a clutch engagement request). In step S94, the clutch 13 is released, and engagement of the clutch 13 is prohibited.

If the four-wheel drive controller 9 determines in step S95 that the rollback flag FRB is 0, i.e., the four-wheel drive controller 9 determines that rollback is absent, then the clutch 13 is engaged and controlled as described below.

Namely, in step S96, the conversion value $N_w$ is derived by the following Equation (6).

$$N_w = Nm \cdot Gm \qquad (6)$$

wherein, Gm is the reduction ratio between the electric motor 4 and the differential gear 14) at a point in time when the electric motor rotational speed Nm was converted to rear wheel rotational speed.

Next, in step S97, the rear wheel rotational speed conversion value $N_{wr}$ of the average rear wheel speed $V_{WR}$ is computed using effective radius of the rear wheels.

Further, in step S98, the four-wheel drive controller 9 determines whether the input/output rotational speeds of the clutch 13 are nearly coincident by determining whether the absolute value of the difference between the rear wheel rotational speed conversion value $N_{wr}$ of the average rear wheel speed $V_{WR}$ and the rear wheel rotational speed conversion value $N_w$ of the electric motor rotational speed Nm is less than a preset value, e.g., 50 rpm.

If the input/output rotational speeds of the clutch 13 do not coincide, then control proceeds to step S99, where the clutch 13 is released and is therefore not engaged. In step S100, the shock of engaging the clutch 13 is ameliorated by engaging the clutch 13 when the input/output rotational speeds of the clutch 13 coincide.

Figure 11:
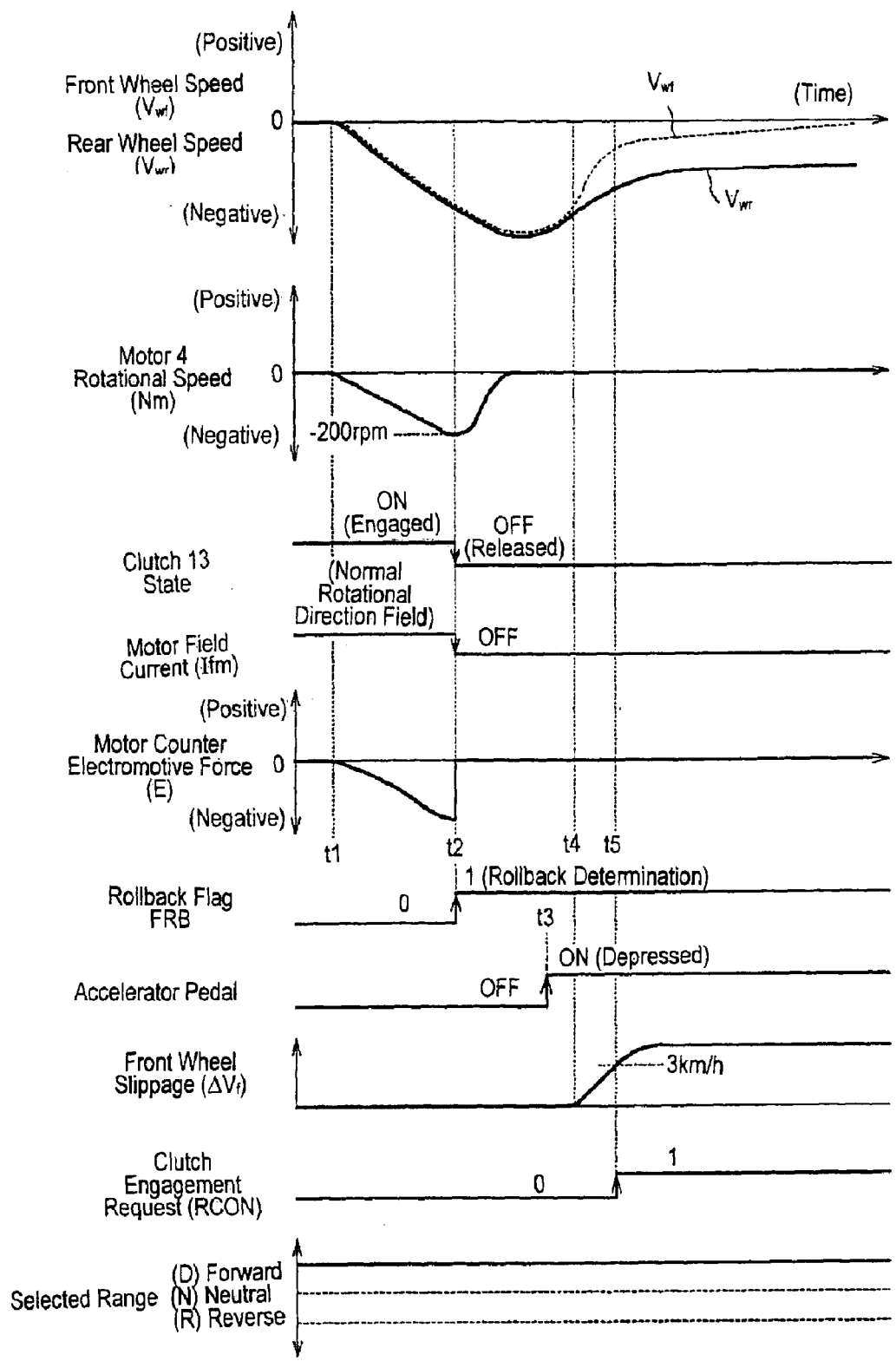
FIG. 11 is an exemplary time chart that illustrates the operation of the rotational direction determining apparatus for an electric motor driven vehicle and the drive control apparatus for an electric motor driven vehicle according to the first embodiment of the present invention.

The functions of the rotational direction discriminating apparatus and the drive controlling apparatus for electric motor driven wheels 3L and 3R according to the present embodiment are explained by the operation time chart shown in FIG. 11.

FIG. 11 is an operation time chart for the case wherein the driver has placed the automatic transmission 5 in the forward drive range (D) with the vehicle stopped on an ascending road, and the vehicle rolls back during the interval when the driver moves their foot from the brake pedal to the accelerator pedal, and then attempts to start from a stop by depressing the accelerator pedal while the vehicle is rolling back.

From a time t1, the average front wheel speed $V_{WF}$ and the average rear wheel speed $V_{WR}$ show negative values, indicative of reverse travel, due to the above-mentioned rolling back of the vehicle. For example, the reverse rotation varies according to the time series shown in the figure.

As described above, because the clutch 13 is engaged unconditionally when the vehicle is stopped, the electric motor 4 is dragged by the rear wheels 3L and 3R, and rotates in reverse at a speed increased by the gear reduction ratio of the reduction gear 12, e.g., as indicated by the electric motor rotational speed Nm. Because of this rotation, the electric motor 4 generates a counterelectromotive force E having a polarity corresponding to the electric motor rotational direction.

Moreover, the electric motor 4 is supplied with the electric motor field current Ifm that is in the normal rotational direction corresponding to the drive range selection (in step S40 of FIG. 6).

At a time t2, at which point the reverse rotational speed Nm of the electric motor 4 attendant with the rolling back of the vehicle reaches negative 200 rpm (in step S37 of FIG. 6), and the rollback determination condition is met along with other conditions (in step S36 and step S38 of FIG. 6). Further, a rollback determination is executed in step S42 through step S46 of FIG. 6 at a time t2.

In FIG. 11, based on the inconsistency in that the polarity of the motor counterelectromotive force E is negative despite the fact that the selected drive range is in the drive range D, it can be seen that the rotational direction of the electric motor driven wheels 3L and 3R is the reverse of the travel direction command due to rollback. Consequently, as shown in FIG. 11, the rollback flag FRB is set to 1.

Simultaneous with the termination of the rollback determination, the clutch 13 is set to a released state, as shown in FIG. 11, by the resetting of the clutch engagement hold flag CLH in step S48 of FIG. 6. Further, the motor counterelectromotive force E is set to 0, as shown in FIG. 11, by the turning off of the electric motor field current Ifm in step S49 of FIG. 6 (also referred to as FIG. 11).

At a time t3, the engine output increases with the depression of the accelerator pedal. Further, after a time t4 of FIG. 11, the average front wheel speed $V_{WF}$ of the left and right front wheels 1L and 1R (engine driven wheels) rises and diverges from the average rear wheel speed $V_{WR}$. The drive control of the electric motor driven wheels 3L and 3R for this case is explained below.

In the above case, the front wheel slippage ΔVf (equal to $V_{WF}-V_{WR}$), which was derived in step S61 of FIG. 7, increases, as shown in FIG. 11, after a time t4 of FIG. 11. At a time t5, when the front wheel slippage ΔVf becomes greater than or equal to the set value of 3 km/h (discussed in step S62 of FIG. 7), the clutch engagement request RCON rises (in step S64 of FIG. 7) because of the need to shift to four-wheel drive.

However, in the present embodiment, even if there is a clutch engagement request at time t5 (in step S93 of FIG. 9), then control proceeds to step S94 of FIG. 9, if there was a rollback determination (FRB=1), at a time t2 (in step S95 of FIG. 9). In step S94, the clutch 13 is released, and the engagement of the clutch 13 is prohibited, as shown in FIG. 11.

Therefore, according to the present embodiment, the engagement of the clutch 13 is prohibited, even if there is a request to engage the clutch 13 due to the occurrence of acceleration slippage of the engine driven wheels 1L and 1R in the interval when the electric motor driven wheels 3L and 3R are rotating in a direction in the reverse of the travel direction command due to rollback in the selected drive range D. Thus, it is possible to avoid the problem of the large shock generated by engaging the clutch 13 in a state where the rotational directions of the input and output of the clutch 13 are the reverse of one another.

Needless to say, the abovementioned functions and effects can likewise be obtained even if rollback occurs such as when the vehicle moves forward while stopped on a descending road in the selected drive range R.

In the present embodiment, when the polarity of the counterelectromotive force E of the electric motor 4 does not match the travel direction command (drive range D, drive range R) of the vehicle given by the driver, then the four-wheel drive controller 9 determines that the electric motor driven wheels 3L and 3R are rotating in a direction that is the reverse of the driver's travel direction command. Therefore, it is possible to discriminate the rotational direction of the electric motor driven wheels 3L and 3R (rollback determination) by a simple configuration in which the polarity of the motor counterelectromotive force E is detected and then compared with the driver's travel direction command. The results of that discrimination enable the solution to the shock problem when re-engaging the clutch 13, as discussed earlier.

Second Embodiment

Figure 12:
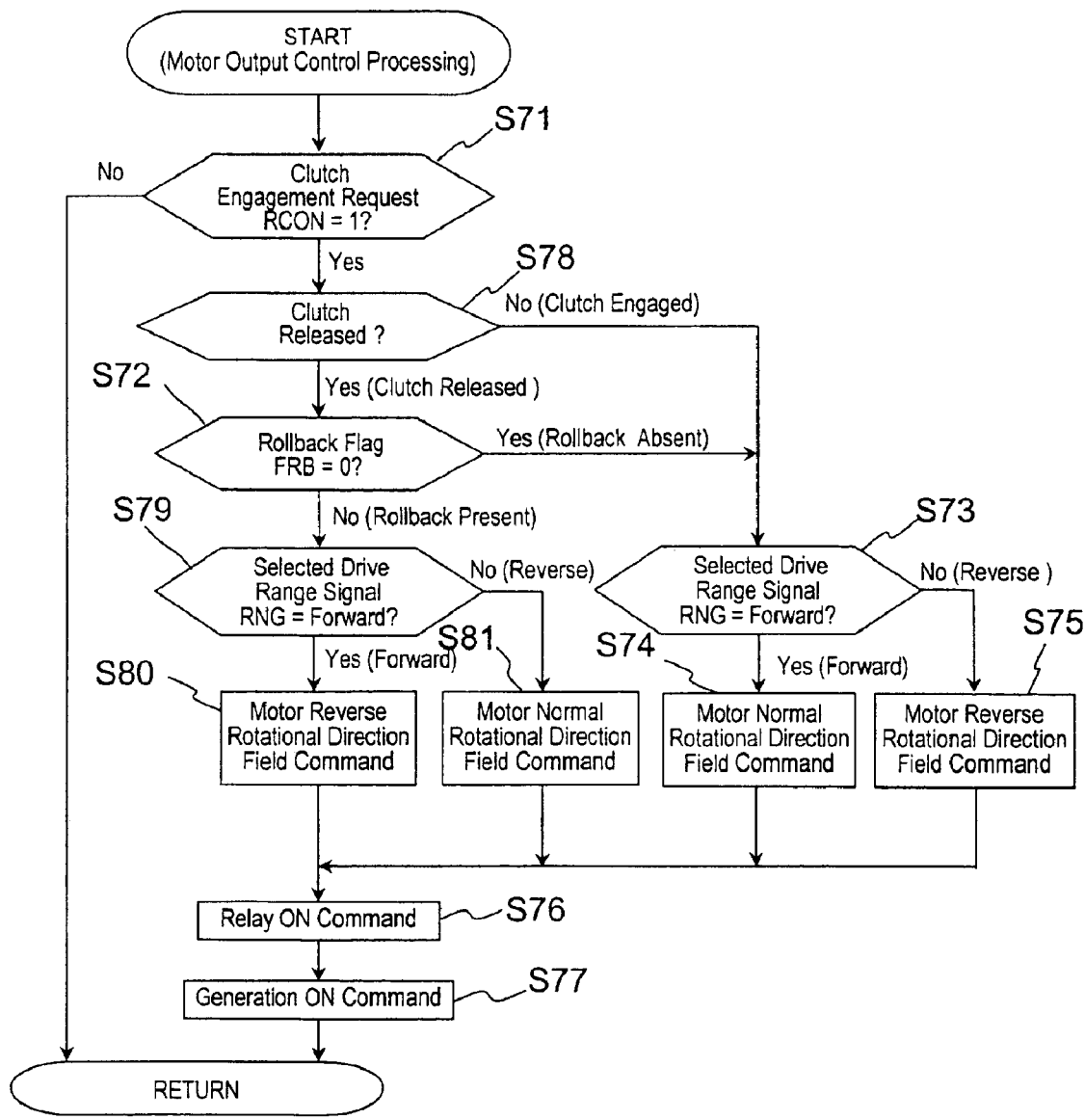
FIG. 12 is a flow chart of motor output control processing corresponding to the subroutine in FIG. 8, according to a second embodiment of the present invention.
Figure 13:
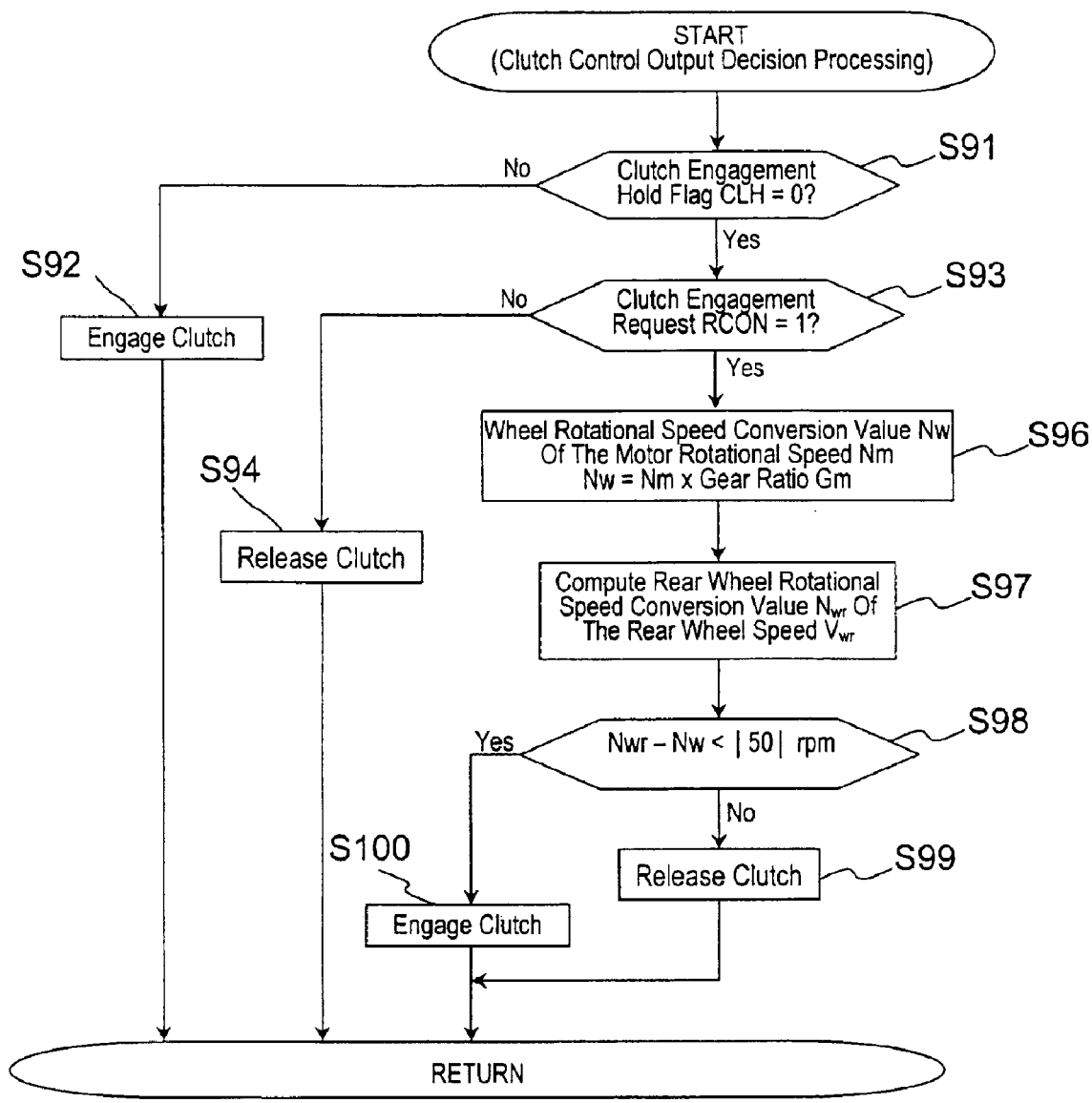
FIG. 13 is a flow chart of clutch control output decision processing corresponding to the subroutine in FIG. 9, according to the second embodiment.

Referring now to FIGS. 12 and 13, a vehicle control apparatus in accordance with a second embodiment will now be explained. In view of the similarity between the first and second embodiments, the parts or steps of the second embodiment that are identical to the parts or steps of the first embodiment will be given the same reference numerals as the parts or steps of the first embodiment. Moreover, the descriptions of the parts or steps of the second embodiment that are identical to the parts or steps of the first embodiment may be omitted for the sake of brevity.

The second embodiment uses the same the main routine as shown in FIG. 4. Therein, the signal detection processing in step S20, the rollback determination processing in step S30, and the clutch engagement request determination processing in step S60 are the same as those illustrated in FIG. 5, FIG. 6, and FIG. 7, respectively. However, the motor output control processing executed in step S70 of FIG. 4 is substituted by a process like the one shown in FIG. 12. In addition, the clutch control output decision processing in step S90 of FIG. 4 is substituted by a process like the one shown in FIG. 13.

In the second embodiment, the rollback determination is executed in a like manner to first embodiment. However, when driving and controlling the electric motor driven wheels 3L and 3R using the results of that determination, first embodiment takes measures against shock by prohibiting a request to engage the clutch 13 even if there is such a request when rollback is occurring. In contrast, the second embodiment differs because it takes measures against shock when rollback is occurring by engaging the clutch 13 after driving the electric motor 4 so that the difference in the rotation of the input and output of the clutch 13 is eliminated, and the input and output rotations match.

Consequently, in the second embodiment, the motor output control processing is modified from the one shown in FIG. 8 to the one shown in FIG. 12. Steps in FIG. 12 that are the same as in FIG. 8 are assigned the same symbol.

In step S71 of FIG. 12, the four-wheel drive controller 9 determines whether the engagement request RCON of the clutch 13 is 1 (Yes). Next, in step S78, the four-wheel drive controller 9 determines whether the clutch 13 is presently in a released state or an engaged state. Subsequently, in step S72, the four-wheel drive controller 9 determines whether rollback has occurred, based on the rollback flag FRB.

If it was determined in step S71 that the clutch engagement request RCON was 0 (No), then the engine driven wheels 1L and 1R are not experiencing acceleration slippage and, consequently, there is no need for electric motor four-wheel drive. Therefore, control terminates without further processing, and the rear wheels are not driven by the electric motor 4.

However, in a case where the four-wheel drive controller 9 determines in step S71 that the clutch engagement request RCON is 1 (Yes) and the four-wheel drive controller 9 determines in step S78 that the clutch 13 is in an engaged state. Alternatively, in a case wherein the four-wheel drive controller 9 determines in step S71 that the clutch engagement request RCON is 1 (Yes) and the four-wheel drive controller 9 determines in step S72 that the rollback flag FRB is 0 (rollback absent), even though the four-wheel drive controller 9 determines in step S78 that the clutch 13 is in a released state, the problem of clutch engagement shock, which is the problem to be solved by the present invention, does not arise. Then control therefore proceeds to step S73, making it possible to drive the rear wheels by driving the electric motor 4, as described below.

In other words, if in the forward command state based on the travel direction command, which was determined in step S73 based on the selected range signal RNG of the automatic transmission, a field in the normal direction is applied in step S74 to the electric motor 4, and a normal rotation command is given to the electric motor 4. If in the reverse command state, then control proceeds to step S75, where a field in the reverse direction is applied to the electric motor 4, and a reverse rotation command is given to the electric motor 4.

Subsequently, in step S76, the relay 11 is turned on, and the electrical line 10 is energized. Furthermore, in step S77, the generator 8 is controlled and made to generate electric power, as shown in FIG. 3. Further, the electric motor 4 is driven in a direction corresponding to the drive range selected by the field direction command so that a torque corresponding to the generated electric power and in a direction corresponding to the travel direction command is output toward the electric motor driven wheels 3L and 3R.

In a case wherein it was determined in step S71 that the clutch engagement request RCON was 1 (Yes), it was determined in step S78 that the clutch 13 was in a released state, and it was determined in step S72 that the rollback flag FRB was 1 (rollback present), then the clutch 13 will engage, as is, with the rotational directions of the input and output of clutch 13 being the reverse to one another, causing the problem of clutch engagement shock that the present invention attempts to solve. Therefore, control proceeds to step S79. In step S79, as described below, the electric motor 4 is driven so that the rotational directions of the input and output of the clutch 13 equalize, making it possible to reduce the shock of engaging the clutch 13. Mainly, based on the travel direction command that was determined in step S79 from the selected drive range signal RNG of the automatic transmission, control proceeds to step S80 if in the forward command state, where a field in the reverse direction is applied to the electric motor 4 in accordance with the rollback determination, and a reverse rotation command is given to the electric motor 4. Control proceeds to step S81 if in the reverse command state, where a field in the normal direction is applied to the electric motor 4 in accordance with the rollback determination, and a normal rotation command is given to the total resistance R. Thus, steps S79, S80 and S81 forms a clutch engagement control section that is configured to drive the electric motor 4 in a direction corresponding to the rotational direction of the wheel 3L and 3R, and then allow the engagement of the clutch 13, when the wheel 3L and 3R are rotating in the opposite direction to the vehicle travel direction command determined by the travel direction command determining section (steps S43, S44).

Subsequently, in step S76, the relay 11 is turned on, and the electrical line 10 is energized. Furthermore, in step S77, the generator 8 is controlled and made to generate electric power, as in FIG. 3. The electric motor 4 is driven so that a torque corresponding to that generated electric power and in the direction of the motor field is output.

Next, FIG. 13 describes in detail the clutch control output decision processing. The processing of the present embodiment is the same as that shown in FIG. 9, with the exception that step S95 is eliminated. Steps in FIG. 13 that are the same as in FIG. 9 are assigned the same symbol.

Because the engagement state of the clutch 13 must be stored if the four-wheel drive controller 9 determines in step S91 that the clutch engagement hold flag CLH is not 0, control proceeds to step S92 where the clutch 13 is engaged.

If the four-wheel drive controller 9 determines in step S91 that the clutch engagement hold flag CLH is 0, then control proceeds to step S93, where the four-wheel drive controller 9 determines whether the clutch engagement request RCON is 1 (Yes) this time. If the clutch engagement request RCON is 0, then control proceeds to step S94, where the clutch 13 is released.

If it was determined in step S93 that the clutch engagement request RCON was 1, then the conversion value Nw is derived in step S96 by computing the conversion value $N_w$ (i.e., $N_w$=Nm·Gm) at a point in time when the electric motor rotational speed Nm was converted to the rear wheel rotational speed. Next, in step S97, the rear wheel rotational speed conversion value $N_{wr}$ of the average rear wheel speed $V_{WR}$ is computed using the rear wheels effective radius.

Further, in step S98, the four-wheel drive controller 9 determines whether the input/output rotational speeds of the clutch 13 are nearly coincident by determining whether the absolute value of the difference between the rear wheel rotational speed conversion value $N_{wr}$ of the average rear wheel speed $V_{WR}$ and the rear wheel rotational speed conversion value $N_w$ of the electric motor rotational speed Nm is less than a set value, e.g., 50 rpm.

If the input/output rotational speeds of the clutch 13 do not coincide, then control proceeds to step S99, where the clutch 13 is released and is therefore not engaged. In step S100, the shock of engaging the clutch is ameliorated by engaging the clutch 13 when the input/output rotational speeds of the clutch 13 coincide.

Figure 14:
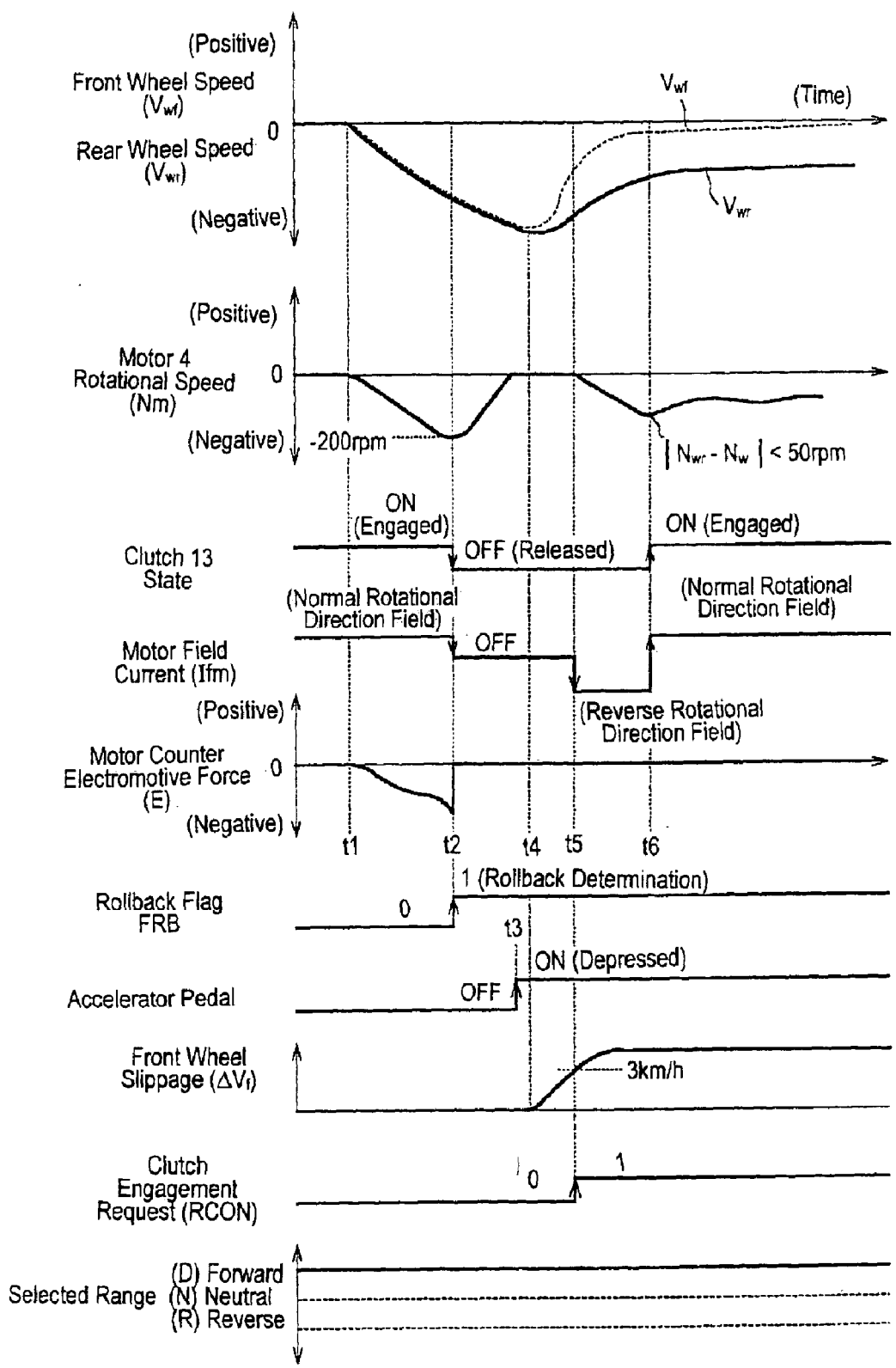
FIG. 14 is an exemplary time chart that illustrates the operation of the rotational direction discriminating apparatus for an electric motor driven vehicle and a drive control apparatus for an electric motor driven vehicle, according to the second embodiment.

The operation of the rotational direction discriminating apparatus and the drive control apparatus of the electric motor driven wheels 3L and 3R according to the abovementioned embodiment is described by the operation time chart illustrated in FIG. 14.

FIG. 14, the same as the case illustrated in FIG. 11, is an operation time chart for the case wherein the driver has placed the automatic transmission 5 in the forward travel range (D) with the vehicle stopped on an ascending road, and the vehicle rolls back during the interval when the driver moves their foot from the brake pedal to the accelerator pedal, and then attempts to start from a stop by depressing the accelerator pedal while the vehicle is rolling back.

The discrimination of the rotational direction of the electric motor driven wheels 3L and 3R is the same as the case in the abovementioned embodiment, as explained below.

From time t1, the average front wheel speed $V_{WF}$ and the average rear wheel speed $V_{WR}$ show negative values, indicative of reverse travel, due to the above-mentioned rolling back of the vehicle. For example, the reverse rotation varies according to the time series shown in the figure.

As described above, because the clutch 13 is engaged unconditionally when the vehicle is stopped, the electric motor 4 is dragged by the rear wheels 3L and 3R, and rotates in reverse at a speed increased by the gear reduction ratio of the reduction gear 12, e.g., as indicated by the electric motor rotational speed Nm. Because of this rotation, the electric motor 4 generates counterelectromotive force E having a polarity corresponding to the electric motor rotational direction.

Moreover, the electric motor 4 is supplied with the field current Ifm that is in the normal rotational direction corresponding to the drive range D selection (in step S40 of FIG. 6).

At a time t2, at which point the reverse rotational speed Nm of the electric motor 4 attendant with the rolling back of the vehicle reaches negative 200 rpm (in step S37 of FIG. 6), and the rollback determination condition is met along with other conditions (in step S36 and step S38 of FIG. 6), a rollback determination is executed in step S42 through step S46 of FIG. 6.

In FIG. 14, based on the inconsistency in that the polarity of the motor counterelectromotive force E is negative despite the fact that the selected drive range is in the drive range D, it can be seen that the rotational direction of the electric motor driven wheels 3L and 3R is the reverse of the travel direction command due to rollback. Consequently, as shown in FIG. 14, the rollback flag FRB is set to 1.

Simultaneous with the termination of the rollback determination, the clutch 13 is set to a released state, as shown in FIG. 14, by the resetting of the clutch engagement hold flag CLH in step S48 of FIG. 6. Further, the motor counterelectromotive force E is set to 0, as shown in FIG. 14, by the turning off of the electric motor field current Ifm in step S49 of FIG. 6 (also referred to as FIG. 14).

At a time t3, the engine output increases with the depression of the accelerator pedal. Further, after a time t4 of FIG. 14, the average front wheel speed $V_{WF}$ of the left and right front wheels 1L and 1R (engine driven wheels) rises and diverges from the average rear wheel speed $V_{WR}$. The drive control of the electric motor driven wheels 3L and 3R for this case is explained below.

In the above case, the front wheel slippage ΔVf (equal to $V_{WF}-V_{WR}$), which was derived in step S61 of FIG. 7, increases, as shown in FIG. 14, after a time t4 of FIG. 14. At a time t5, when the front wheel slippage ΔVf becomes greater than or equal to the set value of 3 km/h (discussed in step S62 of FIG. 7), the clutch engagement request RCON rises (in step S64 of FIG. 7) because of the need to shift to four-wheel drive.

However, as shown in FIG. 14 in the present embodiment, the clutch 13 is not released nor engaged in step S99 of FIG. 13 unless the four-wheel drive controller 9 determines in step S98 of FIG. 13 that the input/output rotational difference ($N_{wr}-N_w$) of the clutch 13 is less than the set value of 50 rpm, even if there is a clutch engagement request at a time t5 (in step S93 of FIG. 13).

Further, during this time period, in the present embodiment, control proceeds sequentially to step S79, step S80, step S76, and step S77 in response to the rollback-present determination made in step S72 of FIG. 12 at a time t2 of FIG. 14. As a result, the electric motor 4 is in the drive range D due to the reverse direction field, as shown in FIG. 14 as the electric motor field current Ifm, the electric motor 4 is given a reverse command in response to the rollback determination, and control proceeds to step S77, where the electric motor 4 is driven in the same direction by the generation command.

By driving the motor in this manner, the rotational direction on the motor side of the clutch 13 is made the same as the rotational direction on the rear wheels side of the clutch 13 when there is rollback. Moreover, the driving of the motor makes the rotational speed of the clutch 13 on the motor side approach the rotational speed on the rear wheels side.

Thereby, upon arriving at time t6 in FIG. 14, at which time it was determined in step S98 of FIG. 13 that the input/output rotational differential ($N_{wr}-N_w$) of the clutch 13 was less than the set value of 50 rpm, the clutch 13 is in engaged in step S100 of FIG. 13, as shown in FIG. 14.

Consequently, according to the present embodiment, when there has been a demand to engage the clutch 13 because of the occurrence of acceleration slippage of the engine driven wheels 1L, 1R while the electric motor driven wheels 3L and 3R are rotating in a direction the reverse of the travel direction command due to rollback in the selected drive range D, the clutch 13 can be engaged without shock by engaging it after matching the input/output rotational directions of the clutch 13 by idling the electric motor 4, and then matching the rotational speeds.

Accordingly, it is possible to avoid the problem wherein a large shock is generated when if the clutch 13 is engaged in a state wherein the input/output rotational directions of the clutch 13 are the reverse of one another, as when rollback is occurring.

Furthermore, it is not necessarily required to combine the matching of the rotational directions of the input/output rotations of the clutch 13 by idling the electric motor 4, and the matching of the rotational speeds. It is possible to obtain the abovementioned functions and effects to a certain extent even if only matching the rotational directions.

Needless to say, the abovementioned functions and effects can be likewise obtained even when rollback is occurring, such as when the vehicle moves forward while stopped on a descending road in the selected drive range R.

Incidentally, if the clutch 13 is engaged at a time t6 in FIG. 14, control proceeds from step S78 in FIG. 12 to step S73 through step S75, step S76 and step S77. As shown in FIG. 14, the electric motor field current Ifm is switched to the normal direction field corresponding to the drive range D. The electric power generated in step S77 drives the electric motor 4 in a direction corresponding to the driver's travel direction command, and motor torque is generated in the corresponding direction.

Consequently, as mentioned above, even if the input/output rotational directions of the clutch 13 are matched in the time t5 through t6, the output torque of the electric motor 4 can reliably be matched to the driver's travel direction command at an engagement t6 of the clutch 13. Further, it is possible to eliminate the uncomfortable feeling experienced by the passengers if the electric motor 4 outputs torque in a direction the reverse of the driver's travel direction command when engaging the clutch 13.

The rotational direction discriminating apparatus of the electric motor driven wheels 3L and 3R according to any one of the embodiments is constituted so that it executes a rollback determination (electric motor driven wheels rotational direction determination) when the electric motor rotational speed Nm is greater than or equal to a set speed of |200| rpm in step S37 of FIG. 6, and prohibits this determination when the electric motor rotational speed Nm is less than a set speed of |200| rpm. Therefore, that determination is executed when the electric motor counterelectromotive force E is at an electric motor rotational speed of a sufficient value to perform the determination, the determination of the counterelectromotive force E polarity is accurate, and the determination accuracy can thereby be raised.

In addition, according to the control program of FIG. 6, the determination result of the rotational direction discrimination (rollback determination) of the electric motor driven wheels 3L and 3R is stored until the vehicle stops, and that determination is re-executed when the vehicle restarts travel. Therefore, the determination results are always kept in the most recent state, and it is possible to continually and reliably take measures to reduce the shock by controlling the drive of the electric motor driven wheels 3L and 3R using the determination results.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-257639. The entire disclosure of Japanese Patent Application No. 2002-257639 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle apparatus comprising:
   a travel direction command determining section configured to determine whether a forward travel command or a reverse travel command has been issued;
   an electric motor counterelectromotive force detecting section configured to detect a counterelectromotive force of an electric motor that drives a wheel of a vehicle; and
   a wheel rotational direction determining section configured to determine whether the wheel is rotating in an opposite direction to a vehicle travel direction command determined by the travel direction command determining section, based on a determination that a polarity of the counterelectromotive force detected by the electric motor counterelectromotive force detecting section does not match the vehicle travel direction command determined by the travel direction command determining section.

2. The vehicle apparatus as recited in claim 1, further comprising
   an electric motor rotational speed detecting section configured to detect a rotational speed of the electric motor; and
   a determination control section configured to allow the wheel rotational direction determining section to execute a determination when the electric motor rotational speed detected by the electric motor rotational speed detecting section is at least equal to a prescribed speed, and prohibit the wheel rotational direction determining section from executing a determination when the electric motor rotational speed is less than the prescribed speed.

3. The vehicle apparatus as recited in claim 1, wherein the wheel rotational direction determining section further configured to maintain a determined result made by the wheel rotational direction determining section until the vehicle stops, and reset the determined result when the vehicle restarts.

4. The vehicle apparatus as recited in claim 1, further comprising
   a clutch engagement command section configured to command an engagement of a clutch disposed between the electric motor and the wheel when the electric motor is required to drive the wheel; and
   a clutch engagement prohibiting section configured to prohibit the engagement of the clutch by the clutch engagement command section, when the wheel rotational direction determining section determines that the wheel is rotating in the opposite direction to the vehicle travel direction command determined by the travel direction command determining section.

5. The vehicle apparatus as recited in claim 1, further comprising:
   a clutch engagement command section configured to command an engagement of a clutch disposed between the electric motor and the wheel when the electric motor is required to drive the wheel; and
   a clutch engagement control section configured to drive the electric motor in a direction corresponding to the rotational direction of the wheel, and then allow the engagement of the clutch by the clutch engagement command section, when the wheel rotational direction determining section determines that the wheel is rotating in the opposite direction to the vehicle travel direction command determined by the travel direction command determining section.

6. The vehicle apparatus as recited in claim 5, wherein the clutch engagement control section is further configured to allow the engagement of the clutch, when input and output rotational speeds of the clutch are substantially equal.

7. The vehicle apparatus as recited in claim 5, further comprising
an electric motor output control section configured to control the electric motor to generate output torque in a direction corresponding to the vehicle travel direction command determined by the travel direction command determining section, when the clutch is engaged in accordance with the clutch engagement command section.

8. The vehicle apparatus as recited in claim 1, further comprising
an internal combustion engine driving a non-electric motor driven wheel; and
a generator driven by the internal combustion engine to generate electrical power to drive the electric motor.

9. The vehicle driving force control apparatus as recited in claim 8, further comprising
a surplus torque computing section configured to compute a surplus torque that substantially corresponds to a difference magnitude by which a drive torque transferred from the main drive source to a second wheel exceeds a road surface reaction force limit torque of the first wheel; and
a generator control section configured to control a generation load torque of the generator to substantially correspond to an acceleration slippage magnitude of the second wheel, when acceleration slippage is determined to be occurring in the second drive wheel.

10. The vehicle driving force control apparatus as recited in claim 9, wherein
the generator control section is further configured to compute an electric motor torque based on the surplus torque.

11. The vehicle apparatus as recited in claim 9, further comprising
an electric motor rotational speed detecting section configured to detect a rotational speed of the electric motor; and
a determination control section configured to allow the wheel rotational direction determining section to execute a determination when the electric motor rotational speed detected by the electric motor rotational speed detecting section is at least equal to a prescribed speed, and prohibit the wheel rotational direction determining section from executing a determination when the electric motor rotational speed is less than the prescribed speed.

12. The vehicle apparatus as recited in claim 9, wherein
the wheel rotational direction determining section further configured to maintain a determined result made by the wheel rotational direction determining section until the vehicle stops, and reset the determined result when the vehicle restarts.

13. The vehicle apparatus as recited in claim 9, further comprising
a clutch engagement command section configured to command an engagement of a clutch disposed between the electric motor and the wheel when the electric motor is required to drive the wheel; and
a clutch engagement prohibiting section configured to prohibit the engagement of the clutch by the clutch engagement command section, when the wheel rotational direction determining section determines that the wheel is rotating in the opposite direction to the vehicle travel direction command determined by the travel direction command determining section.

14. The vehicle apparatus as recited in claim 9, further comprising:
a clutch engagement command section configured to command an engagement of a clutch disposed between the electric motor and the wheel when the electric motor is required to drive the wheel; and
a clutch engagement control section configured to drive the electric motor in a direction corresponding to the rotational direction of the wheel, and then allow the engagement of the clutch by the clutch engagement command section, when the wheel rotational direction determining section determines that the wheel is rotating in the opposite direction to the vehicle travel direction command determined by the travel direction command determining section.

15. The vehicle apparatus as recited in claim 14, wherein
the clutch engagement control section is further configured to allow the engagement of the clutch, when input and output rotational speeds of the clutch are substantially equal.

16. The vehicle apparatus as recited in claim 14, further comprising
an electric motor output control section configured to control the electric motor to generate output torque in a direction corresponding to the vehicle travel direction command determined by the travel direction command determining section, when the clutch is engaged in accordance with the clutch engagement command section.

17. A vehicle apparatus comprising:
travel direction command determining means for determining whether a forward travel command or a reverse travel command has been issued;
electric motor counterelectromotive force detecting means for detecting a counterelectromotive force of an electric motor that drives a wheel of the vehicle; and
a wheel rotational direction determining means for determining whether the wheel is rotating in an opposite direction to a vehicle travel direction command determined by the travel direction command determining means, based on a determination that a polarity of the counterelectromotive force detected by the electric motor counterelectromotive force detecting means does not match the vehicle travel direction command determined by the travel direction command determining means.

18. A method for a vehicle comprising:
determining whether a vehicle travel direction command has been issued is a forward travel command or a reverse travel command;
detecting a counterelectromotive force of an electric motor that drives a wheel of the vehicle; and
determining whether the wheel is rotating in an opposite direction to the vehicle travel direction command that has been determined, based on a determination that a polarity of the counterelectromotive force that has been detected does not match the vehicle travel direction command that has been determined.

19. The vehicle apparatus as recited in claim 1, further comprising a clutch engagement command section configured to selectively command engagement and disengagement of a clutch disposed between the electric motor and the wheel.

20. The vehicle apparatus as recited in claim 19, wherein the wheel rotational direction determining section is further to conduct the determination of the polarity of the counterelectromotive force when the clutch is engaged.

21. The vehicle apparatus as recited in claim 19, wherein the electric motor counterelectromotive force detecting section is further configured to detect the counterelectromotive force of the electric motor generated due to a slave rotation of the electric motor by the wheel upon the vehicle starting to move when the clutch is engaged.

22. The vehicle apparatus as recited in claim 19, wherein the clutch engagement command section is further configured to command the engagement of the clutch when a stopping state of the vehicle is detected.

23. The vehicle apparatus as recited in claim 19, further comprising an electric motor output control section configured to selectively control the electric motor to generate output torque in a direction corresponding to the vehicle travel direction command determined by the travel direction command determining section, when the clutch is engaged in accordance with the clutch engagement command section.

24. The vehicle apparatus as recited in claim 19, wherein the clutch engagement command section is further configured to engage the clutch upon determining the wheel has stopped rotating.

25. The vehicle apparatus as recited in claim 24, wherein the clutch engagement command section is further configured to disengage the clutch upon detection of a prescribed vehicle operating condition.

26. The vehicle apparatus as recited in claim 19, wherein the clutch engagement command section is further configured to disengage the clutch upon detection of a prescribed vehicle operating condition.

* * * * *